US012405564B2

(12) United States Patent
Matsumoto

(10) Patent No.: US 12,405,564 B2
(45) Date of Patent: Sep. 2, 2025

(54) UNIT LOCATING MECHANISM AND IMAGE FORMING APPARATUS

(71) Applicant: KYOCERA Document Solutions Inc., Osaka (JP)

(72) Inventor: Hiromu Matsumoto, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 18/809,858

(22) Filed: Aug. 20, 2024

(65) Prior Publication Data

US 2025/0068119 A1 Feb. 27, 2025

(30) Foreign Application Priority Data

Aug. 23, 2023 (JP) ................................ 2023-135534

(51) Int. Cl.
*G03G 21/16* (2006.01)

(52) U.S. Cl.
CPC ....... *G03G 21/1633* (2013.01); *G03G 21/168* (2013.01); *G03G 2221/169* (2013.01)

(58) Field of Classification Search
CPC ............. G03G 21/1633; G03G 21/168; G03G 2221/169
See application file for complete search history.

(56) References Cited

U.S. PATENT DOCUMENTS

| | | | | |
|---|---|---|---|---|
| 2015/0185685 A1* | 7/2015 | Takemoto | .......... | G03G 21/1661 399/393 |
| 2017/0060078 A1 | 3/2017 | Uohashi | ............. | G03G 21/1633 |
| 2018/0150021 A1* | 5/2018 | Yamamoto | ......... | G03G 21/1609 |
| 2023/0176517 A1* | 6/2023 | Yamauchi | .......... | G03G 21/1633 399/361 |

FOREIGN PATENT DOCUMENTS

| | | |
|---|---|---|
| JP | 2017-043464 A | 3/2017 |

* cited by examiner

*Primary Examiner* — David H Banh
(74) *Attorney, Agent, or Firm* — Stein IP, LLC

(57) ABSTRACT

A cover is turned in a closing direction, and thus a first pressing portion starts to press a unit-side reception portion, after a contact point of a hook portion with a boss portion passes through the lowest point of the boss portion, a second pressing portion starts to press a hook-side reception portion, and the hook portion engages with the boss portion, until the cover reaches a closed position, the unit-side reception portion is separated from the first pressing portion and the turning of the cover in the closing direction is continued, and thus the second pressing portion rides over the hook-side reception portion to release the pressing of the hook-side reception portion performed by the second pressing portion.

4 Claims, 18 Drawing Sheets

UNIT LOCATING MECHANISM AND IMAGE FORMING APPARATUS

INCORPORATION BY REFERENCE

This application is based upon and claims the benefit of priority from the corresponding Japanese Patent Application No. 2023-135534 (filed on Aug. 23, 2023), the entire contents of which are incorporated herein by reference.

BACKGROUND

The present disclosure relates to unit locating mechanisms and image forming apparatuses.

A conventional image forming apparatus includes a rear cover and a conveyance unit which is turned in conjunction with the opening and closing of the rear cover. The rear cover is closed, and thus the conveyance unit is turned in one direction in conjunction therewith to reach a position in which the conveyance unit is located with respect to a main body-side unit.

Conventionally, the conveyance unit is retained in a state where the conveyance unit is pressed against the main body-side unit. In this way, the conveyance unit receives a reaction force from the main body-side unit, and thus the reaction force may be applied to the rear cover. In this case, in order to suppress deformation of the rear cover caused by the reaction force from the main body-side unit, it is necessary to increase the rigidity of the rear cover, for example, by adding ribs to the rear cover or increasing the thickness of the rear cover itself. This causes inconvenience in which the size of the image forming apparatus is increased.

SUMMARY

A unit locating mechanism according to a first aspect of the present disclosure includes a cover, a first unit, a second unit, a locating member and a torsion coil spring. The cover is turned around the axis line of a first turning shaft extending in a first direction orthogonal to an up/down direction to be able to be displaced between a closed position in which the interior of a main body frame is covered from one side in a second direction horizontally orthogonal to the first direction and an open position other than the closed position. The first unit is fitted to the interior of the main body frame and includes a boss portion. The second unit is arranged on a downstream side in a closing direction extending from the open position to the closed position with respect to the cover and is turned around the axis line of a second turning shaft extending parallel to the first turning shaft in a position which is above the first turning shaft and is on the other side opposite to the one side in the second direction with respect to the first turning shaft so as to be able displaced between a first position located with respect to the first unit and a second position other than the first position. The locating member is attached to the second unit to retain the second unit in the first position. The torsion coil spring is attached to the locating member. The locating member includes a cylindrical portion and a hook portion. In the cylindrical portion, the first direction is the direction of a cylindrical shaft. The hook portion is arranged radially outward of the cylindrical portion when viewed in the first direction, can engage with the boss portion so as to hold the boss portion from one side in a circumferential direction around the center of the cylindrical shaft of the cylindrical portion and engages with the boss portion when the second unit is in the first position to restrict the turning of the second unit from the first position to the second position. The second unit includes a support shaft to which the cylindrical portion is fitted and which supports the locating member such that the locating member can be displaced in the circumferential direction. The torsion coil spring biases the locating member to the one side in the circumferential direction that causes the hook portion to engage with the boss portion. The cover includes a first pressing portion and a second pressing portion. The second unit includes a unit-side reception portion that receives a pressure from the first pressing portion. The locating member includes a hook-side reception portion that receives a pressure from the second pressing portion. When the cover is turned from the open position in the closing direction, the first pressing portion starts to press the unit-side reception portion such that the second unit is turned to the first position. After the first pressing portion starts to press the unit-side reception portion, the tip of the hook portion is in contact with the boss portion such that the locating member is displaced to the other side in the circumferential direction against the biasing force of the torsion coil spring. After a contact point of the tip of the hook portion with the boss portion passes through the lowest point of the boss portion when viewed in the first direction, the second pressing portion is in contact with the hook-side reception portion from the one side in the circumferential direction such that the second pressing portion starts to press the hook-side reception portion to displace the locating member to the one side in the circumferential direction and the locating member is displaced to the one side in the circumferential direction to cause the hook portion to engage with the boss portion. After the turning of the cover in the closing direction is started until the cover reaches the closed position, positions of the first turning shaft and the second turning shaft when viewed in the first direction are different from each other such that the unit-side reception portion is separated from the first pressing portion. After the hook portion engages with the boss portion to stop the displacement of the locating member to the one side in the circumferential direction, the turning of the cover in the closing direction is continued such that one of the second pressing portion and the hook-side reception portion is elastically deformed in a direction away from an other thereof, the second pressing portion rides over the hook-side reception portion and the pressing of the hook-side reception portion performed by the second pressing portion is released.

An image forming apparatus according to a second aspect of the present disclosure includes the unit locating mechanism described above. The first unit is a unit that includes an image carrying member which carries an image. The second unit is a unit that includes a transfer roller. The second unit is retained in the first position such that the image carrying member and the transfer roller are pressed against each other so as to form a transfer nip between the image carrying member and the transfer roller. A sheet is conveyed into the transfer nip, and the image is transferred to the sheet.

DETAILED DESCRIPTION

An image forming apparatus 100 according to an embodiment of the present disclosure will be described below with reference to FIGS. 1 to 18. Although in the following description, a color laser printer which can perform a job for printing an image on a sheet S is used as an example, the present disclosure is not limited to a printer, and can be applied to a multi-functional peripheral which has a copying function and the like.

In the following description, a direction perpendicular to a flat floor surface on which the image forming apparatus 100 is installed is defined as an up/down direction, and the up/down direction is identified with a symbol D. Of horizontal directions orthogonal to the up/down direction D, one direction is identified with a symbol D1, and the other direction orthogonal to the one direction D1 is identified with a symbol D2.

For example, the one direction D1 is the width direction (left/right direction) of the image forming apparatus 100. In the following description, the one direction D1 is referred to as the width direction D1. The width direction D1 corresponds to a "first direction". The other direction D2 is the forward/backward direction of the image forming apparatus 100. In the following description, the other direction D2 is referred to as the forward/backward direction D2. The forward/backward direction corresponds to a "second direction".

<Overall Configuration of Image Forming Apparatus>

Figure 1:
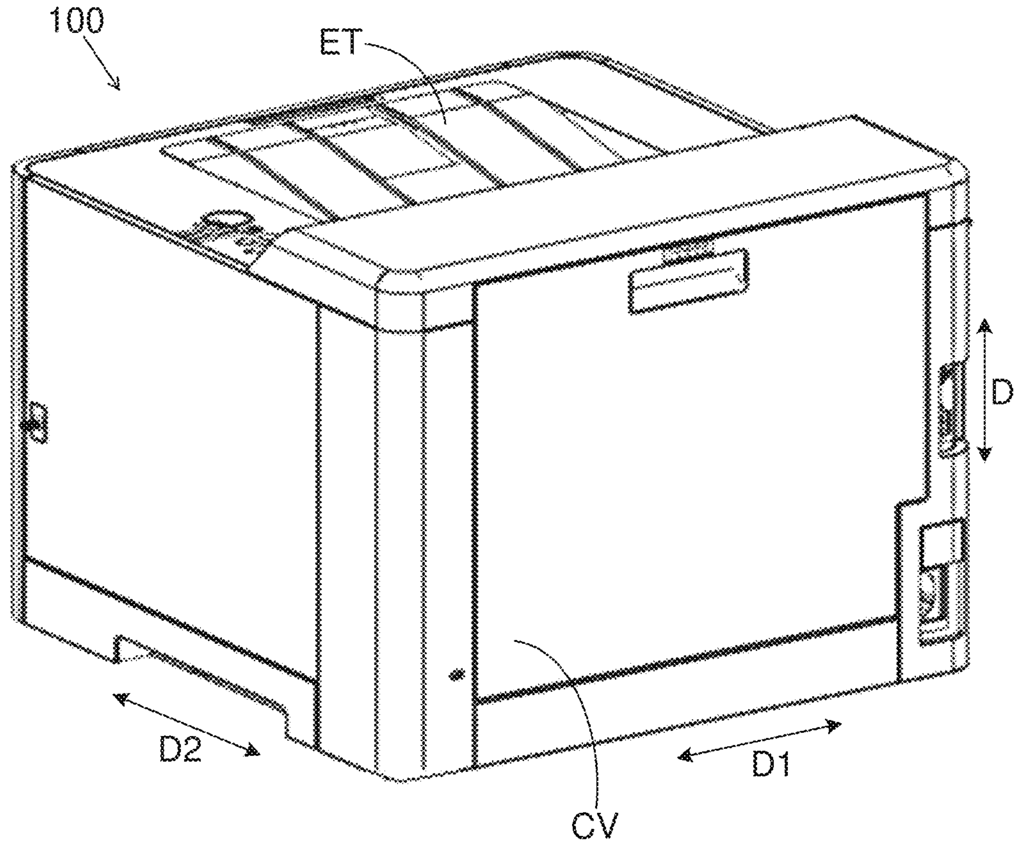
FIG. 1 is a perspective view of an image forming apparatus according to an embodiment.
Figure 2:
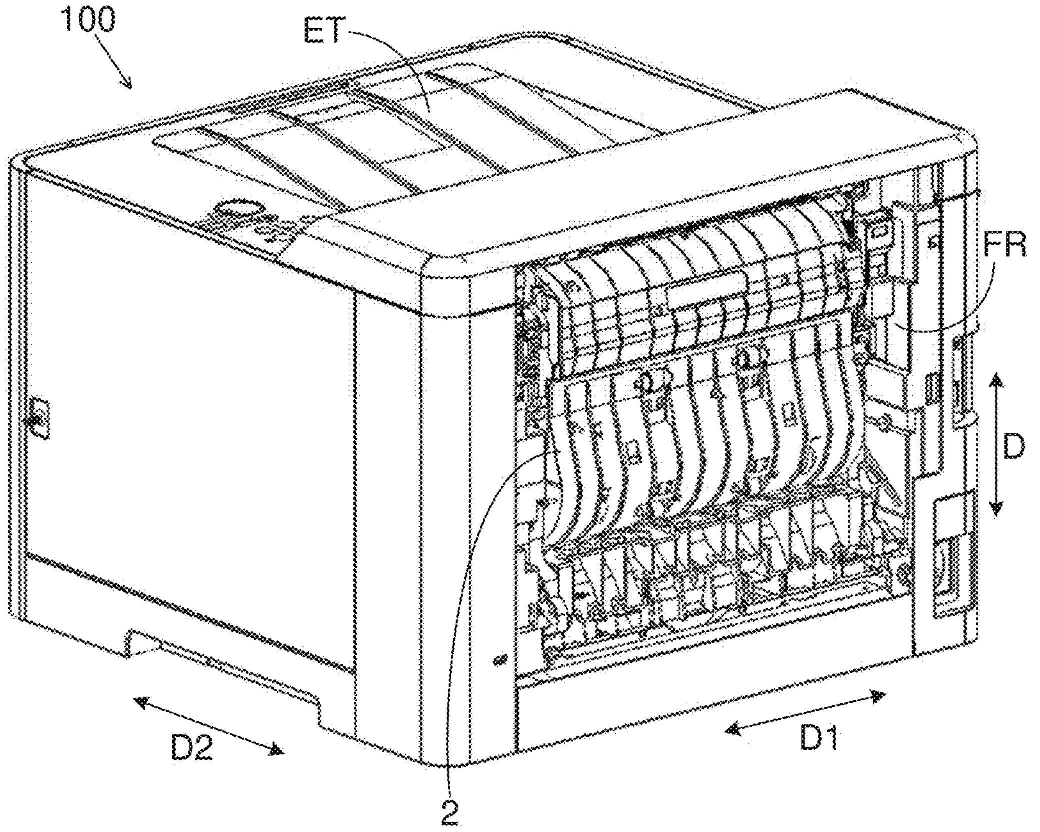
FIG. 2 is a perspective view of the image forming apparatus shown in FIG. 1 in a state where a rear cover is removed.

The image forming apparatus 100 of the present embodiment has an appearance as shown in FIGS. 1 and 2. The image forming apparatus 100 includes a main body frame FR. The image forming apparatus 100 also includes a rear cover CV. The rear cover CV corresponds to a "cover". The main body frame FR is covered with exterior covers including the rear cover CV (for the other covers, symbols are omitted). In FIG. 2, the rear cover CV is omitted, and the interior of the main body frame FR is shown.

The main body frame FR supports the exterior covers. The main body frame FR supports the rear cover CV such that the rear cover CV can be turned around an axis line extending in the width direction D1. Specifically, the main body frame FR includes a first turning shaft RA1 (see FIG. 5) which extends in the width direction D1. The first turning shaft RA1 supports an end portion of the rear cover CV on a lower side. The rear cover CV is turned with the first turning shaft RA1 used as a support point such that an end portion (that is, an end portion on an upper side) on a side opposite to the side supported by the first turning shaft RA1 swings. In other words, the rear cover CV is supported such that the rear cover CV can be opened or closed with respect to the main body frame FR.

The rear cover CV is turned around the axis line of the first turning shaft RA1 to be able to be displaced between a closed position in which the interior of the main body frame FR is covered from the back (that is, the outside) that is one side in the forward/backward direction D2 and an open position other than the closed position. The rear cover CV is opened, and thus the interior of the main body frame FR is exposed to the back. The rear cover CV is closed, and thus the interior of the main body frame FR is covered from the back. For example, when a jam of a sheet S occurs while a print job is being performed, the rear cover CV is opened so that the sheet S is removed.

The position of the rear cover CV shown in FIG. 1 is the closed position. At least a conveyance unit 2 which will be described later is fitted to the interior of the main body frame FR (see FIG. 2). The rear cover CV is opened, and thus the conveyance unit 2 is exposed to the back.

Figure 3:
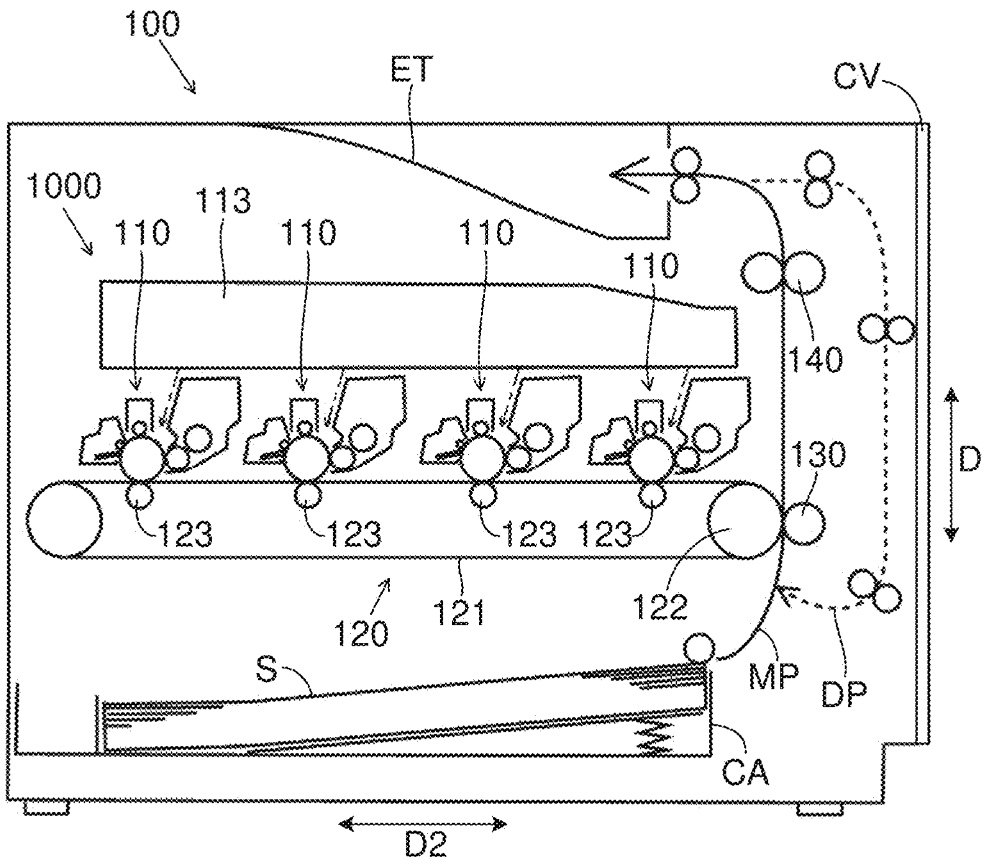
FIG. 3 is a schematic view showing an internal configuration of the image forming apparatus according to the embodiment.

As shown in FIG. 3, the image forming apparatus 100 includes a main conveyance path MP. The main conveyance path MP is passed through a transfer nip which will be described later. In FIG. 3, the main conveyance path MP is schematically indicated by a solid line with an arrow. A double-sided printing conveyance path DP which will be described later is schematically indicated by a dotted line with an arrow.

The image forming apparatus 100 includes a sheet cassette CA. The sheet cassette CA stores sheets S used in a print job. The type of sheet S is not particularly limited.

In the print job, the image forming apparatus 100 supplies the sheet S in the sheet cassette CA to the main conveyance path MP, and conveys the sheet S along the main conveyance path MP. Then, the image forming apparatus 100 prints an image on the sheet S being conveyed. In other words, the image forming apparatus 100 includes a print unit 1000 which prints the image on the sheet S being conveyed.

The print unit 1000 includes image formation units 110 for four colors of cyan, magenta, yellow and black. The image formation units 110 form toner images for the corresponding colors, respectively. With attention focused on a certain image formation unit 110, the configuration of the image formation unit 110 will be described. The image formation units 110 basically have the same configuration. Hence, the description of the configuration of the other image formation units 110 is omitted because the following description can be used for the description.

Figure 4:
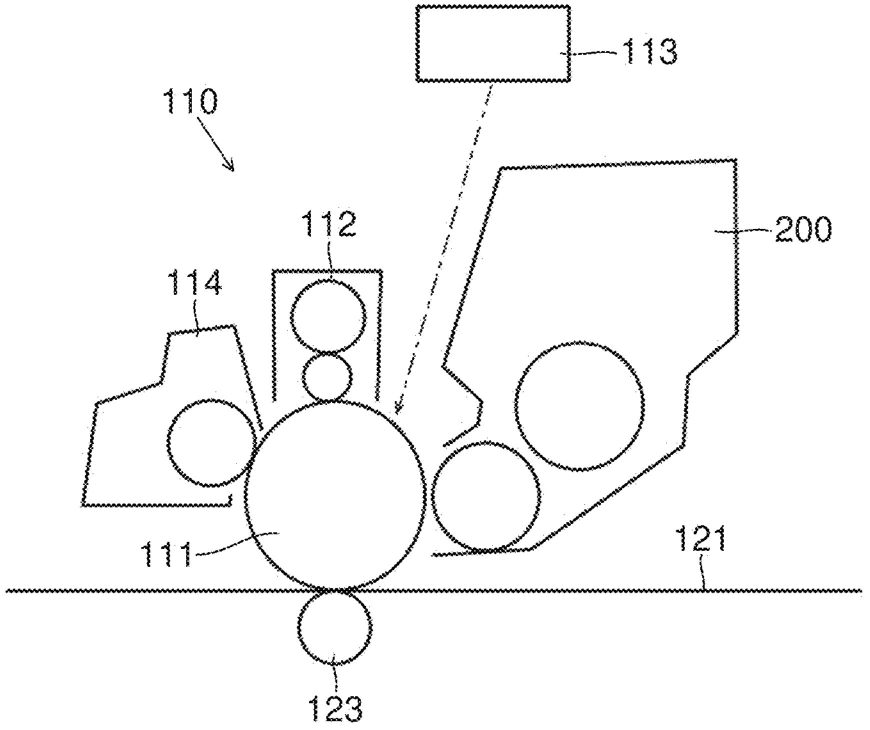
FIG. 4 is a schematic view showing the configuration of an image formation unit in the image forming apparatus according to the embodiment.

As shown in FIG. 4, the image formation unit 110 includes a development cartridge 200. The development cartridge 200 stores the toner of the corresponding color, and uses the toner to perform a development process. The image formation unit 110 includes a photosensitive drum 111 and a charging device 112. The image forming apparatus 100 includes one exposure unit 113 for the image formation units 110 of the four colors. The image formation unit 110 includes a cleaning device 114.

When image formation is performed by the image formation unit 110, the photosensitive drum 111 is rotated. The charging device 112 charges the outer circumferential surface of the photosensitive drum 111. The exposure unit 113 exposes the outer circumferential surface of the photosensitive drum 111 to form an electrostatic latent image on the outer circumferential surface of the photosensitive drum 111. Then, the development cartridge 200 supplies, as the development process, the toner to the outer circumferential surface of the photosensitive drum 111 to develop the electrostatic latent image into the toner image. The toner image on the outer circumferential surface of the photosensitive drum 111 is primarily transferred to an intermediate transfer belt 121 which will be described later. The cleaning device 114 removes the toner which is left on the outer circumferential surface of the photosensitive drum 111 without being transferred to the intermediate transfer belt 121.

With reference back to FIG. 3, the print unit 1000 includes a transfer belt unit 120. The print unit 1000 also includes a secondary transfer roller 130.

The transfer belt unit 120 is arranged below the image formation units 110. The transfer belt unit 120 includes the intermediate transfer belt 121. The intermediate transfer belt 121 is a seamless belt.

The intermediate transfer belt 121 is stretched with a plurality of rollers including a drive roller 122 (for the other rollers, symbols are omitted), and is supported rotatably. The intermediate transfer belt 121 is in contact with the outer circumferential surfaces of the photosensitive drums 111, and is rotated in such a state. The drive roller 122 is rotated by transmission of power from a belt motor (not shown). The drive roller 122 is rotated, and thus the intermediate transfer belt 121 follows the rotation to rotate. The intermediate transfer belt 121 corresponds to an "image carrying member".

The transfer belt unit 120 includes primary transfer rollers 123. The primary transfer rollers 123 are assigned to the individual colors of cyan, magenta, yellow and black, respectively. The primary transfer rollers 123 are arranged on the inner circumferential side of the intermediate transfer belt 121. The primary transfer rollers 123 are respectively arranged opposite the photosensitive drums 111 which carry the toner images of the corresponding colors through the intermediate transfer belt 121.

The secondary transfer roller 130 is arranged opposite the drive roller 122 through the intermediate transfer belt 121. The secondary transfer roller 130 is pressed against the intermediate transfer belt 121. The secondary transfer roller 130 forms the transfer nip between the intermediate transfer belt 121 and itself. The secondary transfer roller 130 corresponds to a "transfer roller".

Each of the image formation units 110 forms the toner image of the corresponding color. Then, each of the primary transfer rollers 123 primarily transfers the toner image to the outer circumferential surface of the intermediate transfer belt 121. The intermediate transfer belt 121 is rotated while carrying, on the outer circumferential surface, the toner images primarily transferred from the photosensitive drums 111. While the sheet S is being passed through the transfer nip, the sheet S makes contact with the outer circumferential surface of the intermediate transfer belt 121. The secondary transfer roller 130 forms a transfer electric field between the intermediate transfer belt 121 and itself to secondarily transfer the toner images to the sheet S being passed through the transfer nip.

The print unit 1000 includes a fixing roller pair 140. The fixing roller pair 140 includes a heating roller and a pressure roller. The heating roller incorporates a heater. The pressure roller is pressed against the heating roller to form a fixing nip between the heating roller and itself. The fixing roller pair 140 is rotated while nipping the sheet S conveyed from the transfer nip. In other words, the fixing roller pair 140 heats and pressurizes the sheet S being passed through the fixing nip. In this way, the fixing roller pair 140 fixes, to the sheet S, the toner images transferred to the sheet S. Thereafter, the sheet S is ejected to an ejection tray ET.

The image forming apparatus 100 can perform, as the print job, not only a single-sided print job for printing the toner images on only one side of the sheet S but also a double-sided print job for printing the toner images on both sides of the sheet S. In order to perform the double-sided print job, the image forming apparatus 100 includes the double-sided printing conveyance path DP.

The double-sided printing conveyance path DP branches from the main conveyance path MP on the downstream side of the fixing nip of the main conveyance path MP in a sheet conveyance direction. Then, the double-sided printing conveyance path DP merges into the main conveyance path MP on the upstream side of the transfer nip of the main conveyance path MP in the sheet conveyance direction.

When the performance job is the single-sided print job, the sheet S is passed through the transfer nip only once, and transfer processing is performed once on the sheet S being passed through the transfer nip. Then, after the first round of the transfer processing, the sheet S is ejected to the ejection tray ET without being processed.

When the performance job is the double-sided print job, the sheet S is passed through the transfer nip twice so that the transfer processing is performed once on each of the front and back surfaces of the sheet S. Specifically, when the sheet S is passed through the transfer nip for the first time, the transfer processing is performed on one side of the sheet S. After the first round of the transfer processing, the sheet S is switched back before the sheet S is fully ejected to the ejection tray ET after the back end of the sheet S is passed through the fixing nip. In this way, the sheet S is drawn into the double-sided printing conveyance path DP from the back end of the sheet S.

Thereafter, the sheet S is conveyed along the double-sided printing conveyance path DP. Then, the sheet S is returned to the main conveyance path MP on the upstream side of the transfer nip in the sheet conveyance direction. The sheet S returned to the main conveyance path MP is passed through the transfer nip again. Here, the directions of the front and back surfaces of the sheet S are reversed from the directions when the sheet S was previously passed through the transfer nip. In this way, when the sheet S is passed through the transfer nip for the second time, the transfer processing is performed on the other side opposite to the one side of the sheet S.

<Units in Apparatus>

The image forming apparatus 100 includes a plurality of units. Some of the units will be described below.

Figure 5:
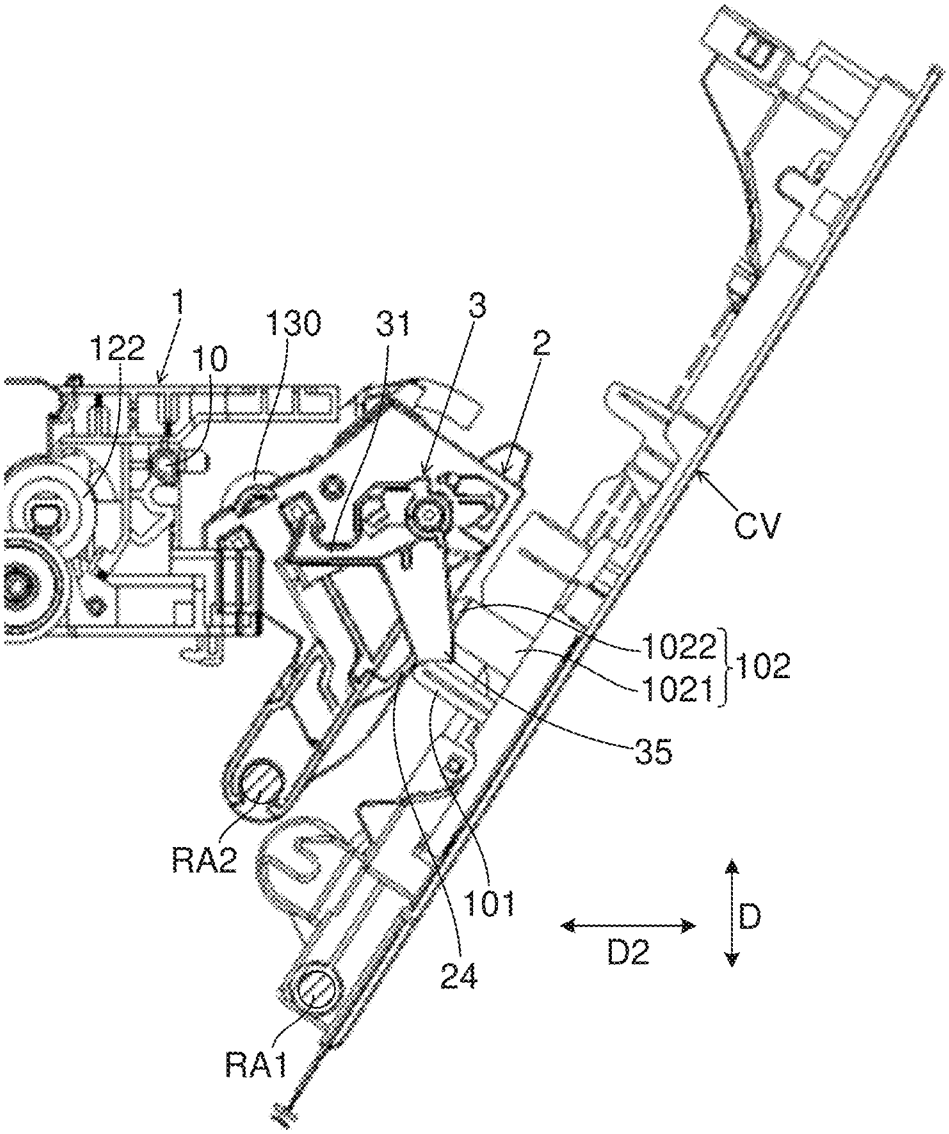
FIG. 5 is a side view in a state where a conveyance unit is separate from a main body-side unit in the image forming apparatus according to the embodiment.

As shown in FIG. 5, the image forming apparatus 100 includes a main body-side unit 1 and a conveyance unit 2. The main body-side unit 1 corresponds to a "first unit", and the conveyance unit 2 corresponds to a "second unit". FIG. 5 shows a state where the rear cover CV is slightly opened (state where the conveyance unit 2 is separate from the main body-side unit 1).

The main body-side unit 1 is fitted to the interior of the main body frame FR. The main body-side unit 1 includes the transfer belt unit 120. In other words, the main body-side unit 1 includes the intermediate transfer belt 121.

The conveyance unit 2 mainly performs the conveyance of the sheet S. The conveyance unit 2 will be described below with reference to FIGS. 5 to 8.

The conveyance unit 2 includes unit-side portions 20. The unit-side portion 20 is arranged on each of one side and the other side in the width direction D1. The pair of unit-side portions 20 are opposite each other in the width direction D1.

The conveyance unit 2 includes conveyance guides G1 which partition parts of the main conveyance path MP. The conveyance guides G1 are located between the pair of unit-side portions 20 in the width direction D1. The conveyance guides G1 partition parts of the main conveyance path MP together with conveyance guides (not shown) in the other units.

The conveyance unit 2 also includes conveyance guides G2 which partition parts of the double-sided printing conveyance path DP. The conveyance guides G2 are located between the pair of unit-side portions 20 in the width direction D1. The conveyance guides G2 partition parts of the double-sided printing conveyance path DP together with a conveyance guide (symbol of which is omitted) provided in the rear cover CV.

Here, the conveyance unit 2 includes the secondary transfer roller 130. However, the conveyance unit 2 is a separate unit from the main body-side unit 1. In this configuration, the intermediate transfer belt 121 and the secondary transfer roller 130 form the transfer nip, and thus the conveyance unit 2 is located with respect to the main body-side unit 1.

The conveyance unit 2 can be turned around an axis line extending in the width direction D1. Specifically, the main body frame FR includes a second turning shaft RA2 which extends in the width direction D1. The second turning shaft RA2 extends parallel to the first turning shaft RA1. The second turning shaft RA2 supports an end portion of the conveyance unit 2 on a lower side. The conveyance unit 2 is turned with the second turning shaft RA2 used as a support point such that an end portion (that is, an end portion on an upper side) on a side opposite to the side supported by the second turning shaft RA2 swings. The conveyance unit 2 is turned around the axis line of the second turning shaft RA2, and thus the conveyance unit 2 can be displaced between a first position and a second position.

Figure 6:
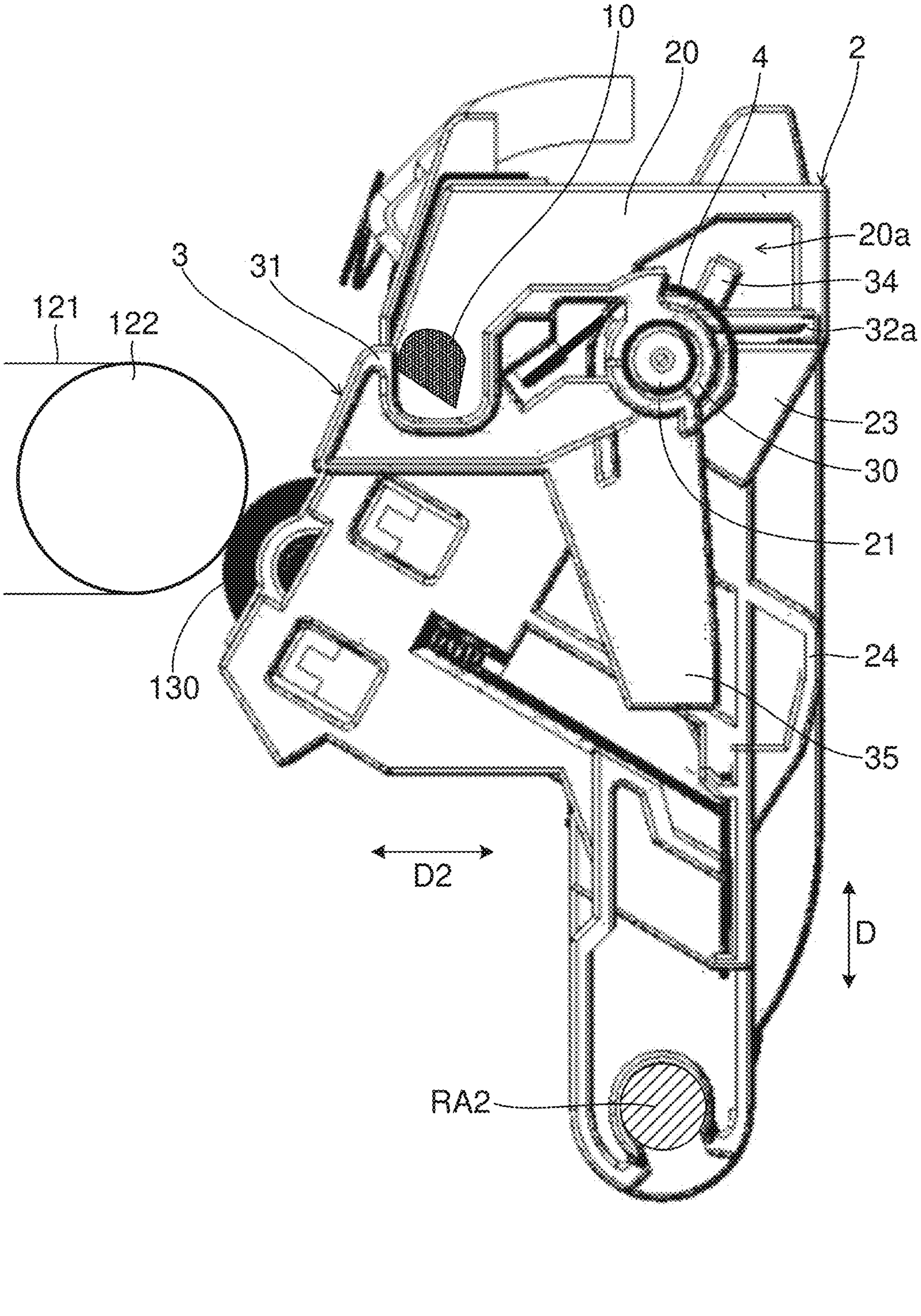
FIG. 6 is a side view of the conveyance unit and a locating member attached to the conveyance unit in the image forming apparatus according to the embodiment.
Figure 7:
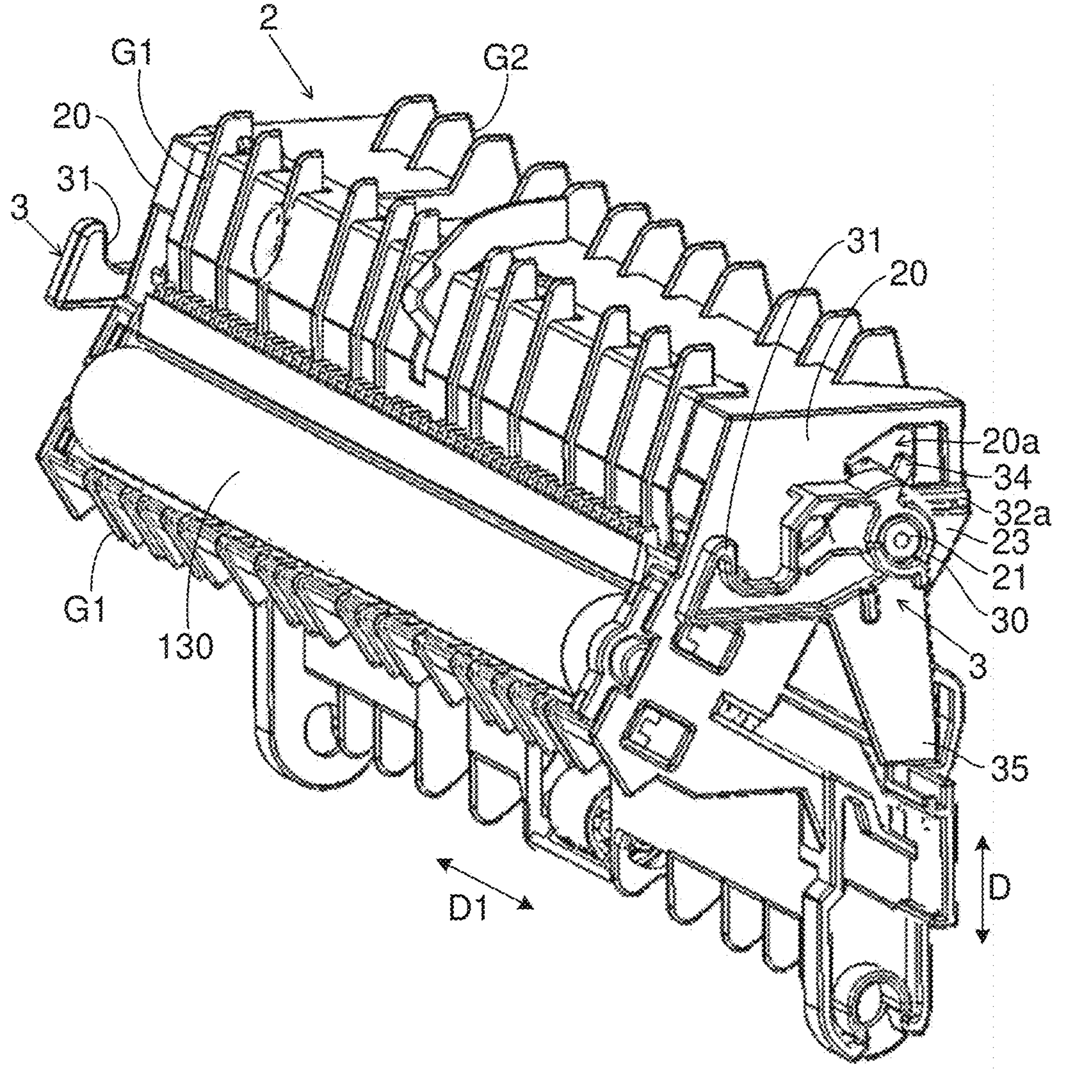
FIG. 7 is a perspective view when the conveyance unit and the locating member attached to the conveyance unit in the image forming apparatus according to the embodiment are viewed from the front.
Figure 8:
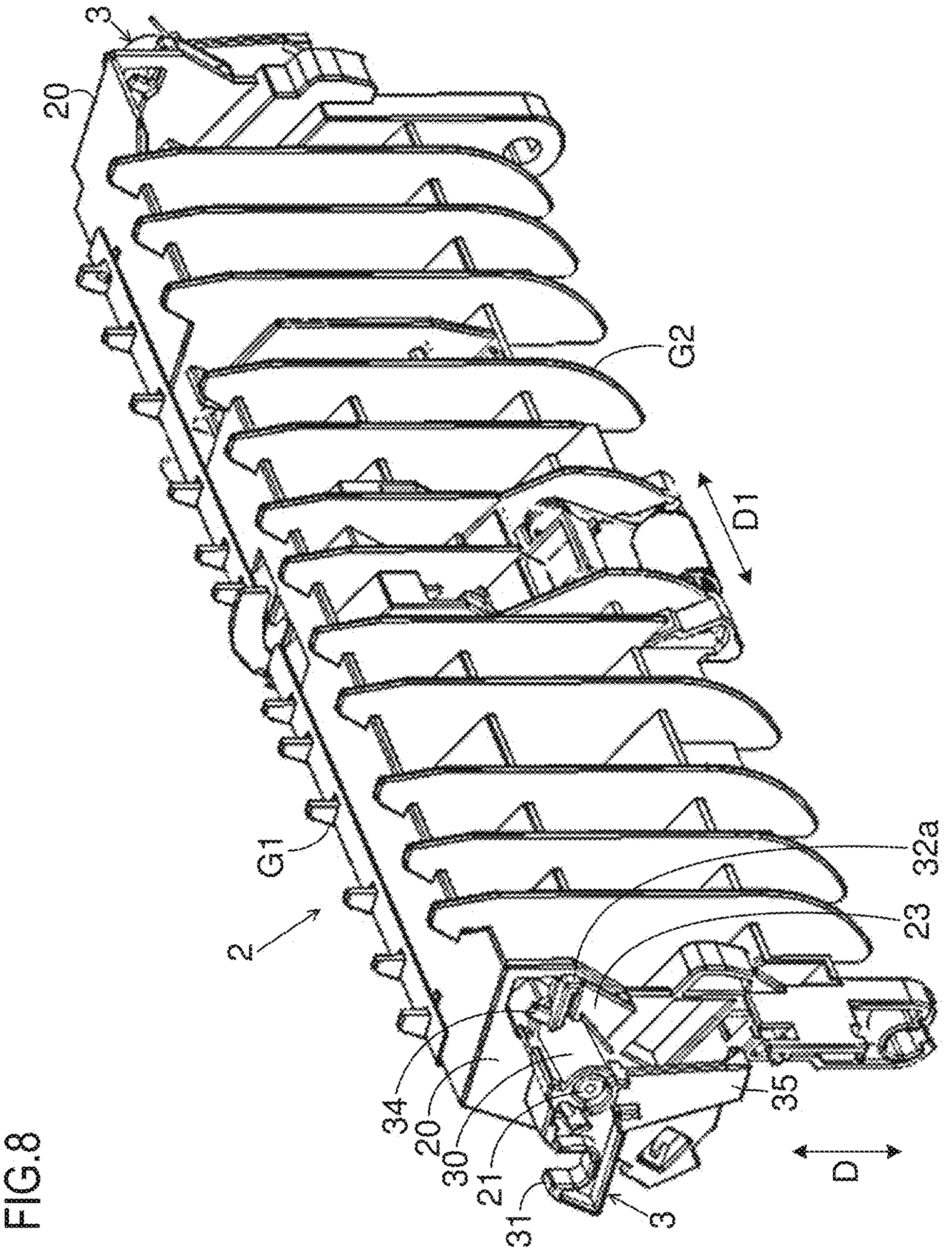
FIG. 8 is a perspective view when the conveyance unit and the locating member attached to the conveyance unit in the image forming apparatus according to the embodiment are viewed from the back.

The first position is a position in which the conveyance unit 2 is located with respect to the main body-side unit 1 in the main body frame FR. The position of the conveyance unit 2 shown in FIG. 6 is the first position. The conveyance unit 2 is retained in the first position (that is, the conveyance unit 2 is located with respect to the main body-side unit 1), and thus the secondary transfer roller 130 is pressed against the intermediate transfer belt 121. In this way, the transfer nip is formed between the intermediate transfer belt 121 and the secondary transfer roller 130.

The second position is a position other than the first position, and is a position in which the conveyance unit 2 is not located with respect to the main body-side unit 1. In a state where the conveyance unit 2 is in the second position, it is impossible to locate the conveyance unit 2 with respect to the main body-side unit 1.

In a state where the conveyance unit 2 is retained in the first position, a part of the main conveyance path MP is formed by the conveyance guides G1 of the conveyance unit 2 and the conveyance guides of the other units. In a state where the conveyance unit 2 is retained in the first position, and the rear cover CV is closed, a part of the double-sided printing conveyance path DP is formed by the conveyance guides G2 of the conveyance unit 2 and the conveyance guide of the rear cover CV.

For example, when a jam of the sheet S occurs while the print job is being performed, a jam processing operation of opening the rear cover CV and turning the conveyance unit 2 to the second position is performed. Since the rear cover CV is opened, and thus the double-sided printing conveyance path DP is exposed, the sheet S jammed in the double-sided printing conveyance path DP can be removed. Since the conveyance unit 2 is turned to the second position, and thus the main conveyance path MP is exposed, the sheet S jammed in the main conveyance path MP can be removed.

After the jam processing operation, an operation of closing the rear cover CV is performed. The rear cover CV is closed, and thus the conveyance unit 2 is pushed by the rear cover CV. In this way, in synchronization with the closing of the rear cover CV, the conveyance unit 2 is returned to the first position.

In this configuration, it is necessary to reliably retain the conveyance unit 2 in the first position during a normal operation (for example, while the print job is being performed). If the conveyance unit 2 is shifted from the first position while the print job is being performed, the image quality may be lowered or a jam may occur.

Hence, the image forming apparatus 100 includes a locating member 3. The locating member 3 locates the conveyance unit 2 with respect to the main body-side unit 1. In other words, the locating member 3 retains the conveyance unit 2 in the first position. Furthermore, in other words, the locating member 3 restricts the turning of the conveyance unit 2 from the first position to the second position.

<Locating of Unit>

Figure 9:
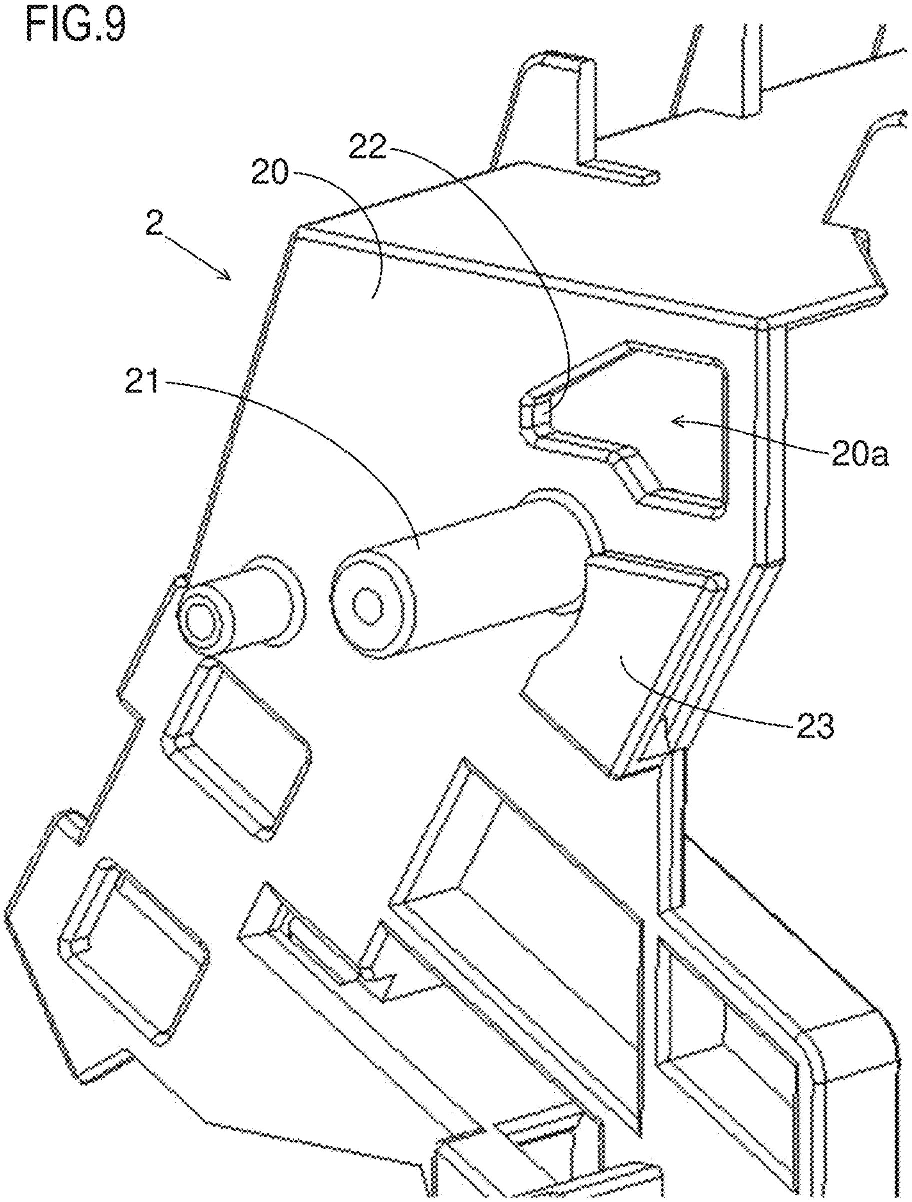
FIG. 9 is an enlarged perspective view of an area around the unit-side portion of the conveyance unit in the image forming apparatus according to the embodiment.
Figure 12:
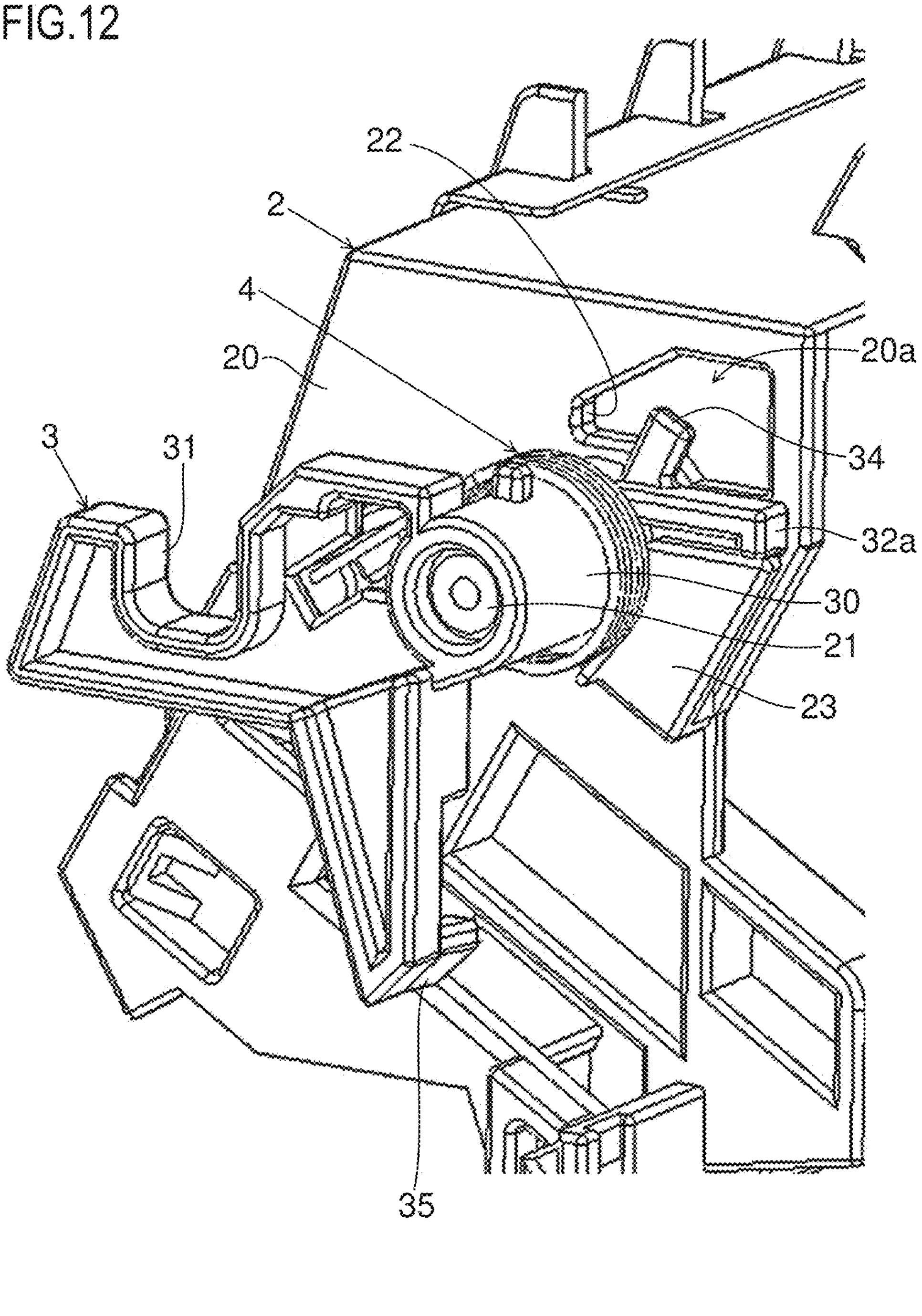
FIG. 12 is a perspective view in a state where the locating member shown in FIG. 11 is turned to one side in a circumferential direction.

The structure of the locating member 3 and a structure for attaching the locating member 3 to the conveyance unit 2 will be described below with reference to FIGS. 9 and 12.

The locating member 3 is a hook which can engage with another member. The locating member 3 is attached to each of the pair of unit-side portions 20 in the conveyance unit 2. The structure of the locating member 3 and the structure for attaching the locating member 3 to the conveyance unit 2 are the same on each of one side and the other side. Hence, a description will be given below for only the one side, and the description for the other side is omitted because the following description can be used for the description.

The locating member 3 is arranged outward of the unit-side portion 20 in the width direction D1. The secondary transfer roller 130 and the like are arranged inward of the unit-side portion 20 in the width direction D1. The "outward" in the width direction D1 refers to a direction which extends from the center of the conveyance unit 2 in the width direction D1 toward one side or the other side in the width direction D1. The "inward" in the width direction D1 refers to a direction which extends from the one side or the other side of the conveyance unit 2 in the width direction D1 toward the center in the width direction D1.

The unit-side portion 20 includes a support shaft 21 which supports the locating member 3 outward in the width direction D1. The support shaft 21 protrudes outward from the unit-side portion 20 in the shape of a cylinder or a tube. The outer shape of the support shaft 21 is circular when viewed in the width direction D1. For example, the unit-side portion 20 is made of resin. The support shaft 21 is integrally molded with the unit-side portion 20.

The locating member 3 includes a cylindrical portion 30. In a state where the locating member 3 is attached to the unit-side portion 20, the width direction D1 is the direction of the cylindrical shaft of the cylindrical portion 30. The support shaft 21 is inserted into the cylindrical portion 30, and thus the locating member 3 is attached to the unit-side portion 20. The cylindrical portion 30 is fitted to the support shaft 21 from outside in the width direction D1. In the following description, a circumferential direction around the center of the cylindrical shaft of the cylindrical portion 30 fitted to the support shaft 21 (that is, the support shaft 21) when viewed in the width direction D1 is simply referred to as a circumferential direction.

The cylindrical portion 30 can slide in the circumferential direction with respect to the outer circumferential surface of the support shaft 21. In other words, the support shaft 21 supports the locating member 3 such that the locating member 3 can be displaced in the circumferential direction. The cylindrical portion 30 can also slide in the width direction D1 with respect to the outer circumferential surface of the support shaft 21.

The locating member 3 includes a hook portion 31. The hook portion 31 is arranged radially outward of the cylindrical portion 30 when viewed in the width direction D1. The hook portion 31 is a part which extends radially outward of the cylindrical portion 30 (that is, in a direction away from the cylindrical portion 30) when viewed in the width direction D1, and is a hook-shaped part which can engage with a boss portion 10 to be described later from one side in the circumferential direction. The cylindrical portion 30 is displaced in the circumferential direction, and thus the hook portion 31 is turned around the center of the cylindrical shaft of the cylindrical portion 30.

In order to use the locating member 3 to retain the conveyance unit 2 in the first position, the main body-side unit 1 includes the boss portion 10 (see FIGS. 5 and 6) which protrudes in the width direction D1. The boss portion 10 is arranged on the turning path of the hook portion 31 when the hook portion 31 is turned around the center of the cylindrical shaft of the cylindrical portion 30 as viewed in the width direction D1 (that is, when the hook portion 31 is turned in the circumferential direction).

When the conveyance unit 2 is in the first position, the hook portion 31 engages with the boss portion 10 so as to hold the boss portion 10 from the one side in the circumferential direction. In this way, the hook portion 31 restricts the turning of the conveyance unit 2 from the first position to the second position. Consequently, the conveyance unit 2 is retained in the first position. In other words, the conveyance unit 2 is located with respect to the main body-side unit 1.

However, the locating member 3 is not fixed to the unit-side portion 20 (that is, the conveyance unit 2), and is removable with respect to the unit-side portion 20. In this configuration, if some countermeasure is not taken, the cylindrical portion 30 may come off the support shaft 21 such that the locating member 3 drops off the unit-side portion 20.

If the locating member 3 drops off the unit-side portion 20, the engagement of the hook portion 31 with the boss portion 10 is released, and thus the conveyance unit 2 is turned from the first position to the second position. In other words, the conveyance unit 2 is shifted with respect to the main body-side unit 1.

In order to suppress such inconvenience, the unit-side portion 20 includes a restriction portion 23. The locating member 3 includes a portion to be restricted 32.

The portion to be restricted 32 is arranged radially outward of the cylindrical portion 30 and in a position different from the hook portion 31 in the circumferential direction when viewed in the width direction D1. For example, the locating member 3 includes a part 32*a* which extends radially outward of the cylindrical portion 30 when viewed in the width direction D1, and includes, as the portion to be restricted 32, a protrusion part which protrudes from the part 32*a* to the one side in the circumferential direction. The cylindrical portion 30 can be displaced in the circumferential direction. Hence, the portion to be restricted 32 arranged radially outward of the cylindrical portion 30 can be turned around the center of the cylindrical shaft of the cylindrical portion 30.

The restriction portion 23 is arranged in a predetermined position (which is hereinafter referred to as a restriction position) on the turning path of the portion to be restricted 32 which is turned around the center of the cylindrical shaft of the cylindrical portion 30 when viewed in the width direction D1. The hook portion 31 is caused to engage with the boss portion 10 from the one side in the circumferential direction, and thus the portion to be restricted 32 is arranged in the restriction position. In this way, in a state where the hook portion 31 engages with the boss portion 10 from the one side in the circumferential direction, the restriction portion 23 overlaps the portion to be restricted 32 from the outside in the width direction D1.

In a state where the restriction portion 23 overlaps the portion to be restricted 32 from the outside in the width direction D1, even when the portion to be restricted 32 (that is, the locating member 3) attempts to move outward in the width direction D1, the portion to be restricted 32 collides with the restriction portion 23. In other words, the restriction portion 23 restricts the movement of the locating member 3 outward in the width direction D1. Consequently, it is possible to suppress the dropping of the locating member 3 off the unit-side portion 20.

However, when the locating member 3 is displaced to the other side in the circumferential direction, the restriction portion 23 and the portion to be restricted 32 do not overlap each other in the width direction D1. In this case, the locating member 3 inconveniently drops off the unit-side portion 20.

Hence, the image forming apparatus 100 further includes a torsion coil spring 4. The torsion coil spring 4 is attached to the locating member 3. The torsion coil spring 4 uses its biasing force to restrict the displacement of the locating member 3 to the other side in the circumferential direction.

The torsion coil spring 4 includes a winding spring portion 40 (that is, a coil-shaped part). The winding spring portion 40 is fitted to the cylindrical portion 30 to be arranged on the outer circumference of the cylindrical portion 30. In other words, the cylindrical portion 30 is inserted into the winding spring portion 40. The winding spring portion 40 is fitted to the cylindrical portion 30, and thus the torsion coil spring 4 is attached to the locating member 3.

The torsion coil spring 4 includes a first arm portion 41 which extends from one end of the winding spring portion 40 and a second arm portion 42 which extends from the other end of the winding spring portion 40. Each of the first arm portion 41 and the second arm portion 42 extends tangentially to the winding spring portion 40 when viewed in the width direction D1.

The first arm portion 41 engages with the locating member 3. Specifically, the locating member 3 includes a first engagement portion 33. The first engagement portion 33 is arranged radially outward of the cylindrical portion 30 when viewed in the width direction D1. The first arm portion 41 engages with the first engagement portion 33.

The second arm portion 42 engages with the conveyance unit 2. Specifically, a second engagement portion 22 is provided in the unit-side portion 20. An edge portion of an opening 20*a* which penetrates the unit-side portion 20 in the width direction D1 functions as the second engagement portion 22. The second arm portion 42 engages with the second engagement portion 22.

The first arm portion 41 engages with the first engagement portion 33 (that is, the locating member 3), the second arm portion 42 engages with the second engagement portion 22 (that is, the unit-side portion 20) and thus the torsion coil spring 4 generates a force for biasing the locating member 3 to the one side in the circumferential direction. In other words, the torsion coil spring 4 biases the locating member 3 in a direction which causes the hook portion 31 to engage with the boss portion 10 (that is, to the one side in the circumferential direction). Furthermore, in other words, the torsion coil spring 4 restricts the displacement of the locating member 3 to the other side in the circumferential direction.

In this way, it is possible to suppress the displacement of the locating member 3 to the other side in the circumferential direction. When the locating member 3 is not displaced to the other side in the circumferential direction, the overlapping of the restriction portion 23 and the portion to be restricted 32 in the width direction D1 is maintained, and thus it is possible to suppress the dropping of the locating member 3 off the unit-side portion 20. Consequently, it is possible to suppress the turning of the conveyance unit 2 from the first position to the second position. In other words, it is possible to suppress the shifting of the conveyance unit 2 with respect to the main body-side unit 1.

Figure 10:
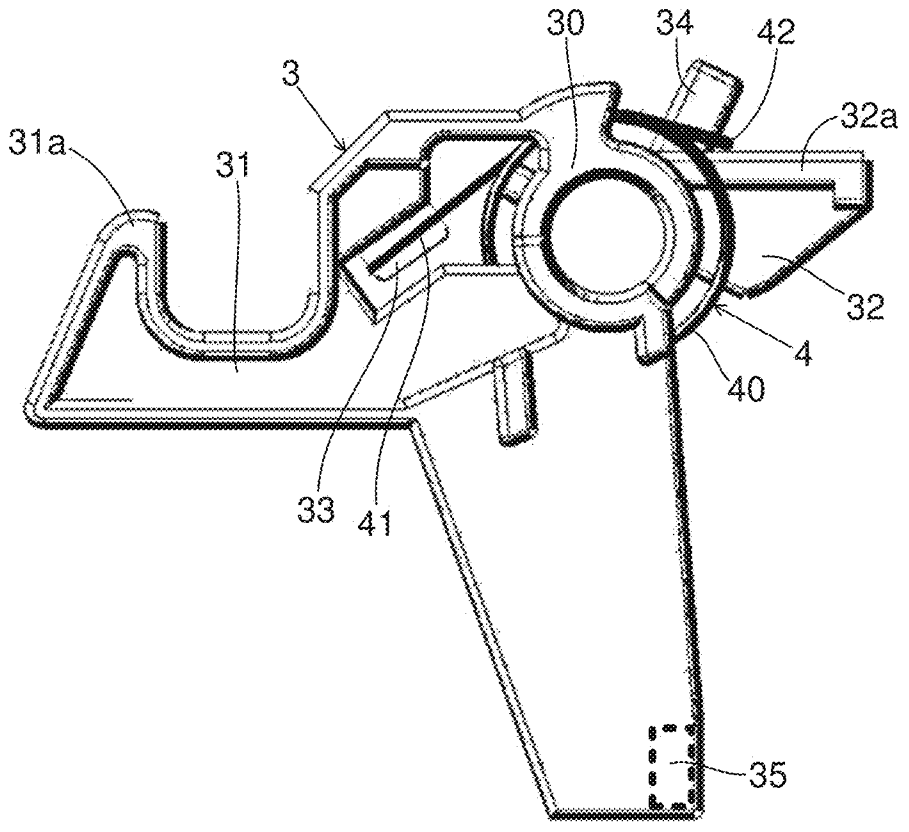
FIG. 10 is a side view of the locating member and a torsion coil spring temporarily fixed to the locating member in the image forming apparatus according to the embodiment.
Figure 11:
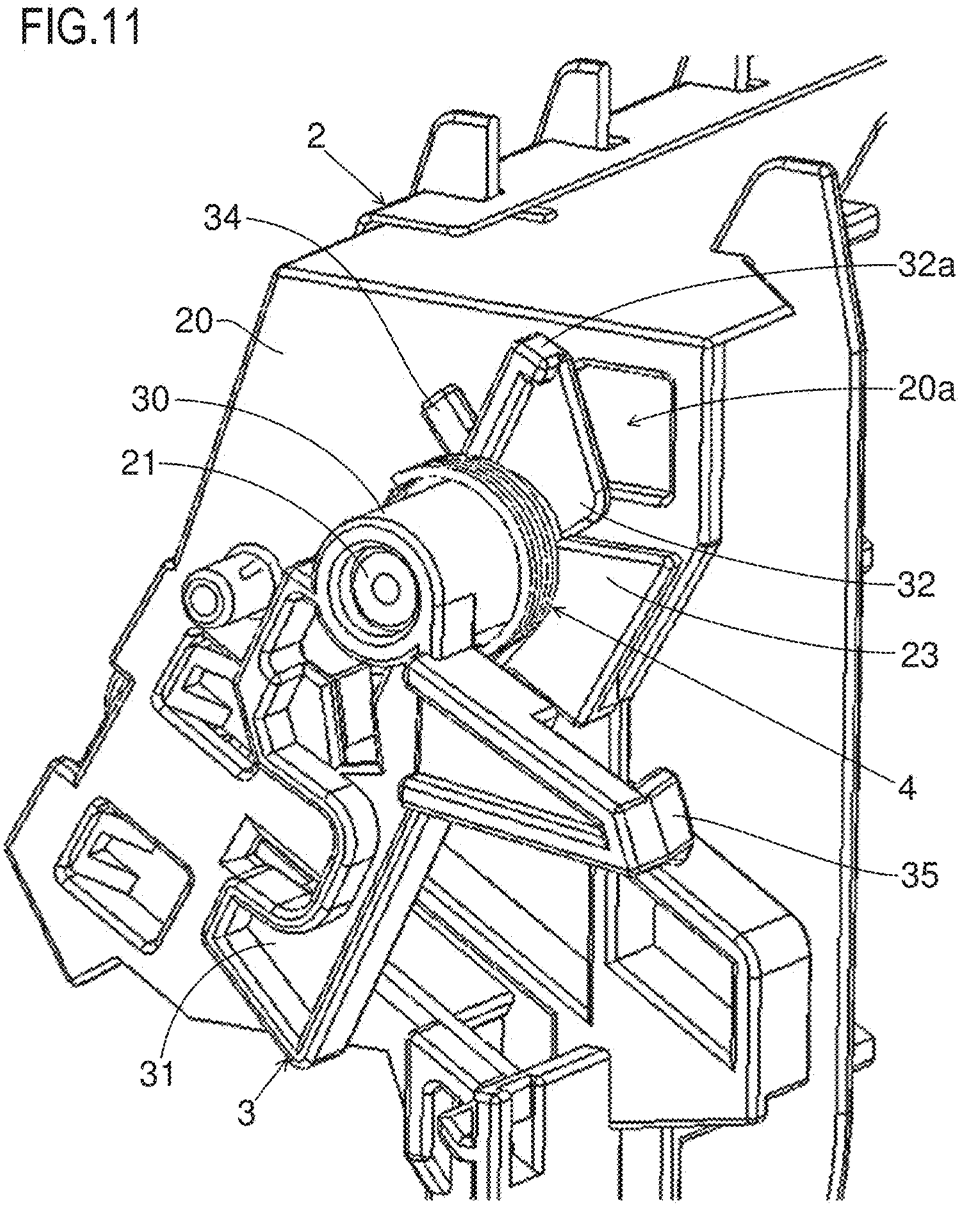
FIG. 11 is a perspective view for illustrating a step of attaching the locating member in the embodiment.

When the locating member 3 is attached to the unit-side portion 20, the second arm portion 42 is caused to engage with the temporary fixing portion 34 (see FIG. 10). Then, as shown in FIG. 11, in a state where the restriction portion 23 and the portion to be restricted 32 do not overlap each other in the width direction D1, the cylindrical portion 30 is fitted to the support shaft 21. Thereafter, as shown in FIG. 12, the locating member 3 is displaced to the one side in the circumferential direction. Although not shown in FIG. 12, the engagement of the second arm portion 42 is switched from the temporary fixing portion 34 to the second engagement portion 22.

<Turning of Conveyance Unit to First Position>

The rear cover CV is opened or closed, and thus the conveyance unit 2 is turned in synchronization with the opening or closing, with the result that the conveyance unit 2 is displaced between the first position and the second position. A specific description will be given below.

In the following description, the direction of turning of the rear cover CV when the rear cover CV is turned from the open position to the closed position is simply referred to as a closing direction. The direction of turning of the rear cover CV when the rear cover CV is turned from the closed position to the open position is simply referred to as an opening direction.

The rear cover CV and the conveyance unit 2 are arranged in a positional relationship shown in FIG. 5. The position of the rear cover CV shown in FIG. 5 is the open position. In FIG. 5, a counterclockwise direction around the center of the first turning shaft RA1 is the closing direction, and a clockwise direction is the opening direction. The position of the conveyance unit 2 shown in FIG. 5 is the second position.

The conveyance unit 2 is arranged on the downstream side of the rear cover CV in the closing direction. The second turning shaft RA2 supporting the conveyance unit 2 is arranged above the first turning shaft RA1 supporting the rear cover CV when viewed in the width direction D1. Furthermore, the second turning shaft RA2 is located forward of the first turning shaft RA1 (that is, on the other side opposite to the one side in the forward/backward direction D2) when viewed in the width direction D1.

In this way, when in a state where the conveyance unit 2 is in the second position, the rear cover CV is turned from the open position to the closed position, the conveyance unit 2 is pressed by the rear cover CV to turn from the second position to the first position. In other words, the displacement of the conveyance unit 2 between the first position and the second position can be synchronized with the opening and closing of the rear cover CV.

The rear cover CV includes a first pressing portion 101 which presses the conveyance unit 2 and a second pressing portion 102 which presses the locating member 3. The conveyance unit 2 includes a unit-side reception portion 24 which is pressed by the first pressing portion 101. The locating member 3 includes a hook-side reception portion 35 which is pressed by the second pressing portion 102.

The first pressing portion 101 is arranged closer to the first turning shaft RA1 than the second pressing portion 102 when viewed in the width direction D1. In other words, the second pressing portion 102 is arranged more distantly from the first turning shaft RA1 than the first pressing portion 101.

Figure 13:
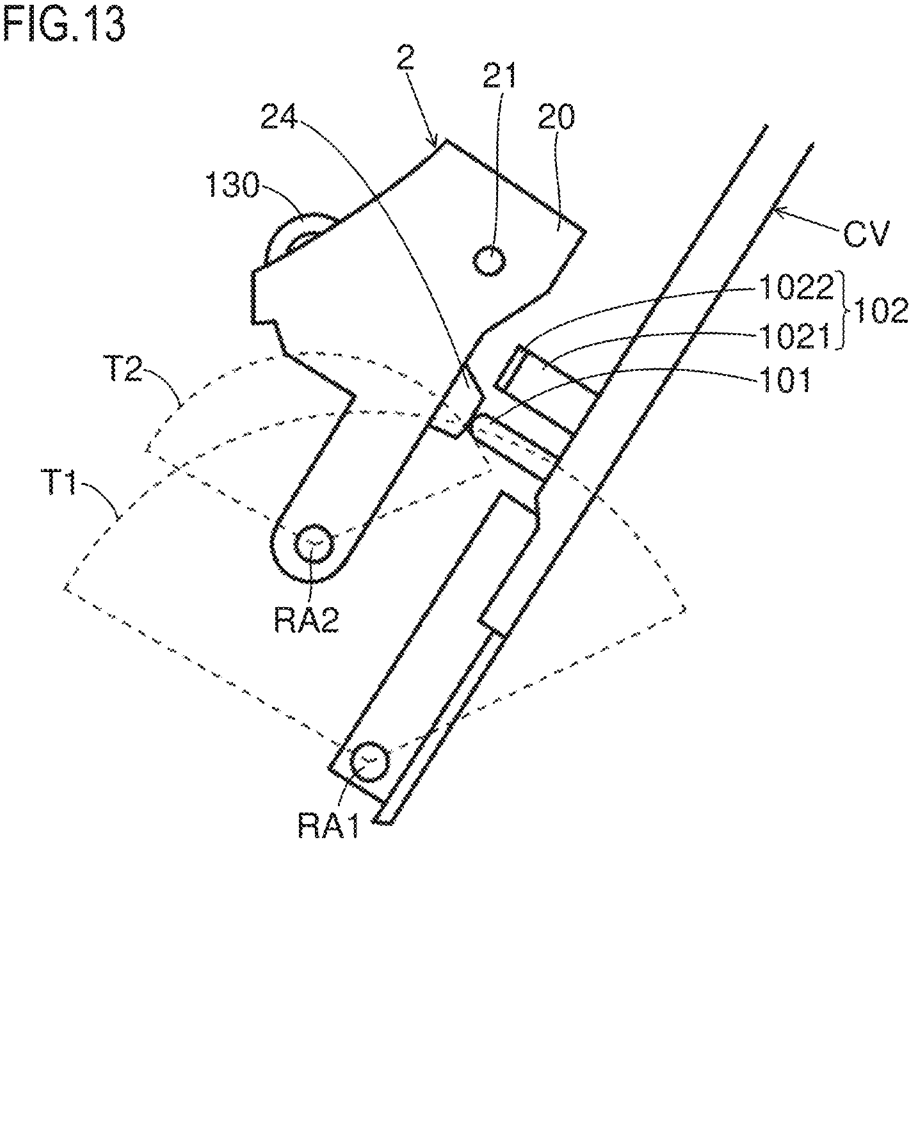
FIG. 13 is a diagram showing a positional relationship of a first turning shaft and a second turning shaft in the image forming apparatus according to the embodiment.

In a state where the rear cover CV is in the open position and the conveyance unit 2 is in the second position, as shown in FIG. 13, the first pressing portion 101 is in contact with the unit-side reception portion 24. In this way, in the state where the rear cover CV is in the open position and the conveyance unit 2 is in the second position, the rear cover CV is turned from the open position in the closing direction, and thus the first pressing portion 101 starts to press the unit-side reception portion 24 such that the conveyance unit 2 is turned from the second position to the first position. In FIG. 13, for ease of understanding, the locating member 3 is omitted.

Figure 14:
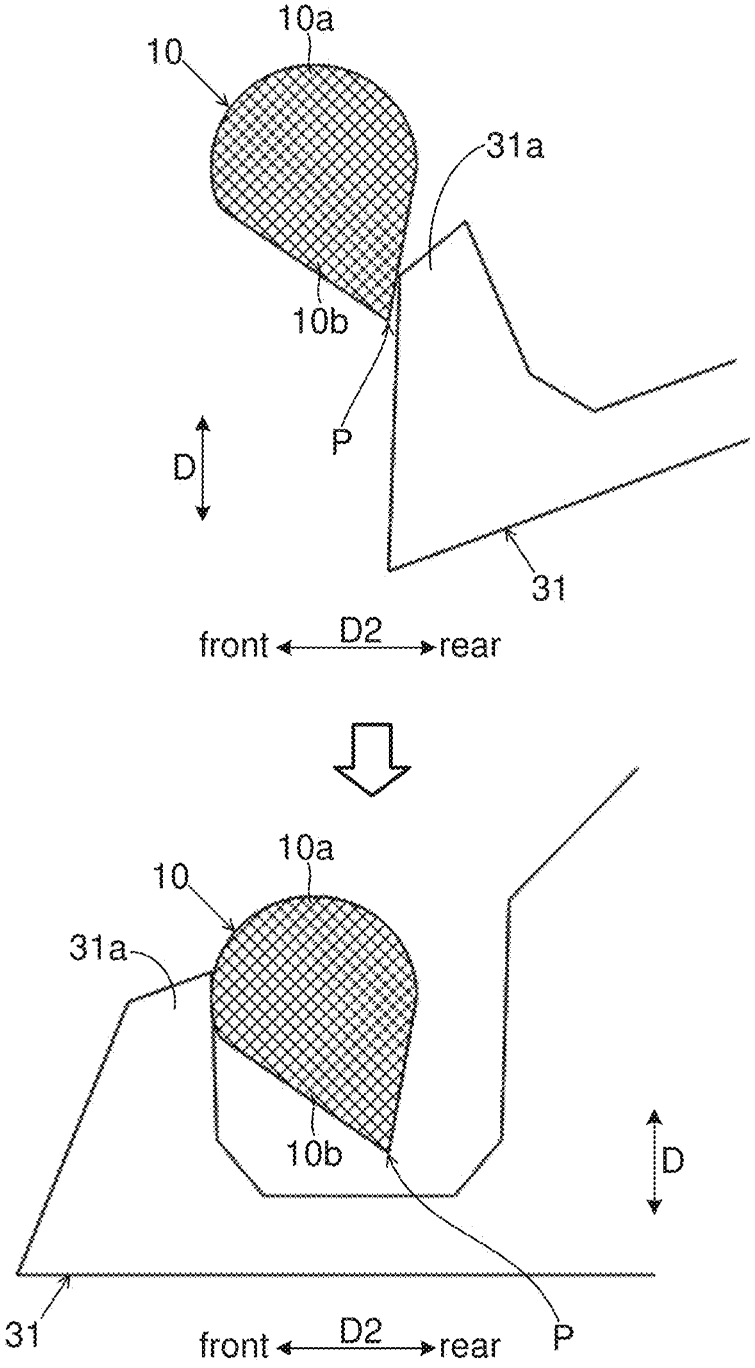
FIG. 14 is a diagram showing a positional relationship of a boss portion and a hook portion in the image forming apparatus according to the embodiment.

After the first pressing portion 101 starts to press the unit-side reception portion 24 (that is, while the conveyance unit 2 is being turned from the second position to the first position), as shown in FIG. 14, the tip 31*a* of the hook portion 31 is in contact with the boss portion 10, and thus the locating member 3 is displaced in the circumferential direction. In the initial stage, the outer part of the tip 31*a* of the hook portion 31 on a side opposite to the inner part which engages with the boss portion 10 is in contact with the boss portion 10. Hence, in the initial stage, the hook portion 31 does not engage with the boss portion 10 (see an upper diagram in FIG. 14).

In a state where the outer part of the tip 31*a* of the hook portion 31 is in contact with the boss portion 10, the turning of the rear cover CV from the open position in the closing direction (that is, the turning of the conveyance unit 2 from the second position to the first position) proceeds, and thus the locating member 3 is displaced to the other side in the circumferential direction against the biasing force of the torsion coil spring 4 with the outer part of the tip 31*a* of the hook portion 31 in contact with the boss portion 10. Thereafter, the locating member 3 is displaced to the one side in the circumferential direction.

Specifically, as shown in the upper diagram in FIG. 14, the outer part of the tip 31*a* of the hook portion 31 first makes contact with a part of the boss portion 10 on the one side in the forward/backward direction D2 (hereinafter simply referred to as the one side part of the boss portion 10). Thereafter, the tip 31*a* of the hook portion 31 is moved from the one side part of the boss portion 10 to ride over the lowest point P. Then, as shown in a lower diagram in FIG. 14, the tip 31*a* of the hook portion 31 reaches a part of the boss portion 10 on the other side opposite to the one side in the forward/backward direction D2 (hereinafter simply referred to as the other side part of the boss portion 10). Here, the inner part of the tip 31*a* of the hook portion 31 makes contact with the other side part of the boss portion 10. In this way, the hook portion 31 engages with the boss portion 10.

The boss portion 10 includes a first part 10*a* which is a part of the boss portion 10 on an upper side and a second part 10*b* which a part located on the lower side of the first part 10*a*. The first part 10*a* has an arc-shaped circumference which is convex toward the upper side when viewed in the width direction D1. The second part 10*b* is in a shape tapered downward from the first part 10*a* (that is, a substantially triangular shape) when viewed in the width direction D1. The second part 10*b* protrudes sharply downward from the first part 10*a*. In other words, the second part 10*b* is a part which protrudes downward from the first part 10*a* and is V-shaped in side view. In this configuration, in the boss portion 10, the position of the tip of the second part 10*b* on the lower side is the lowest point P.

Figure 15:
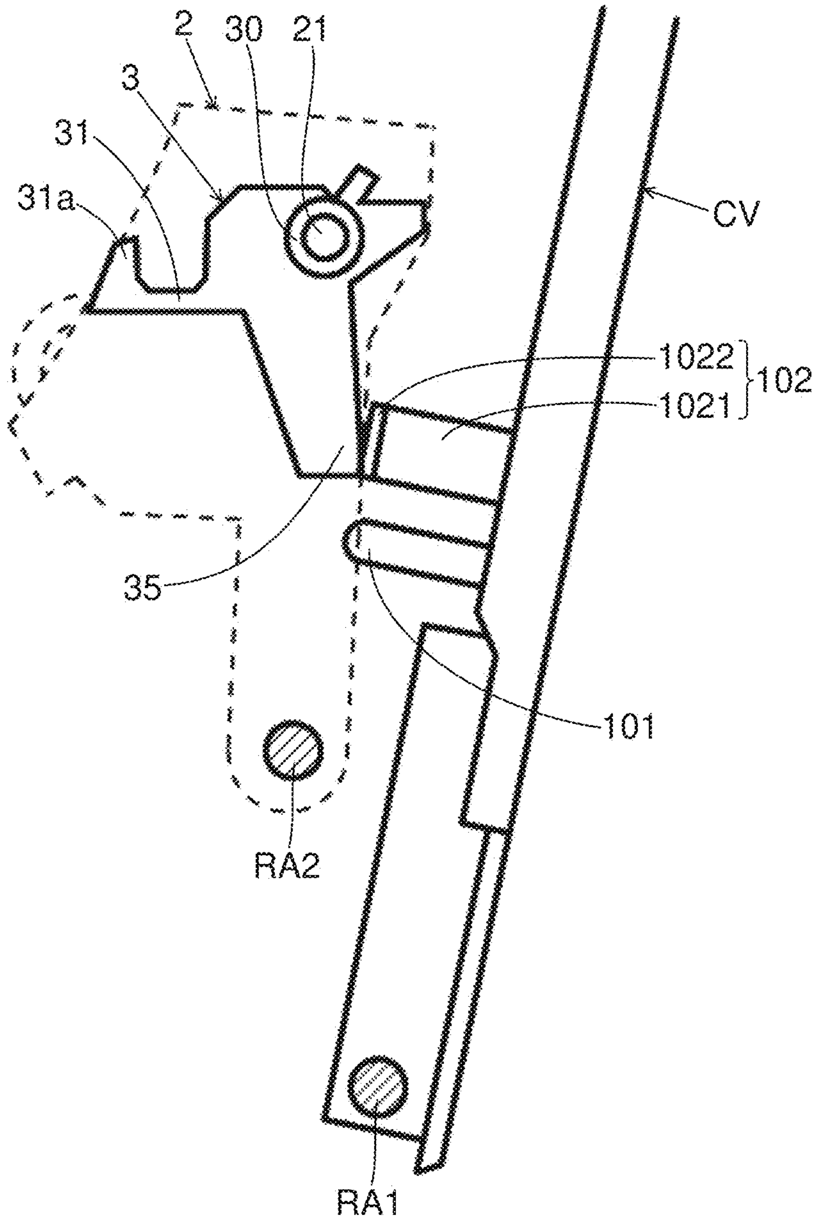
FIG. 15 is a diagram showing a state where a second pressing portion in the image forming apparatus according to the embodiment starts to press a hook-side reception portion.

After the contact point of the tip 31*a* of the hook portion 31 with the boss portion 10 passes through the lowest point P of the boss portion 10, as shown in FIG. 15, the second pressing portion 102 is in contact with the hook-side reception portion 35 from the one side in the circumferential direction such that the second pressing portion 102 starts to press the hook-side reception portion 35 to displace the locating member 3 to the one side in the circumferential direction. In FIG. 15, for ease of understanding, the conveyance unit 2 is indicated by dotted lines.

Figure 16:
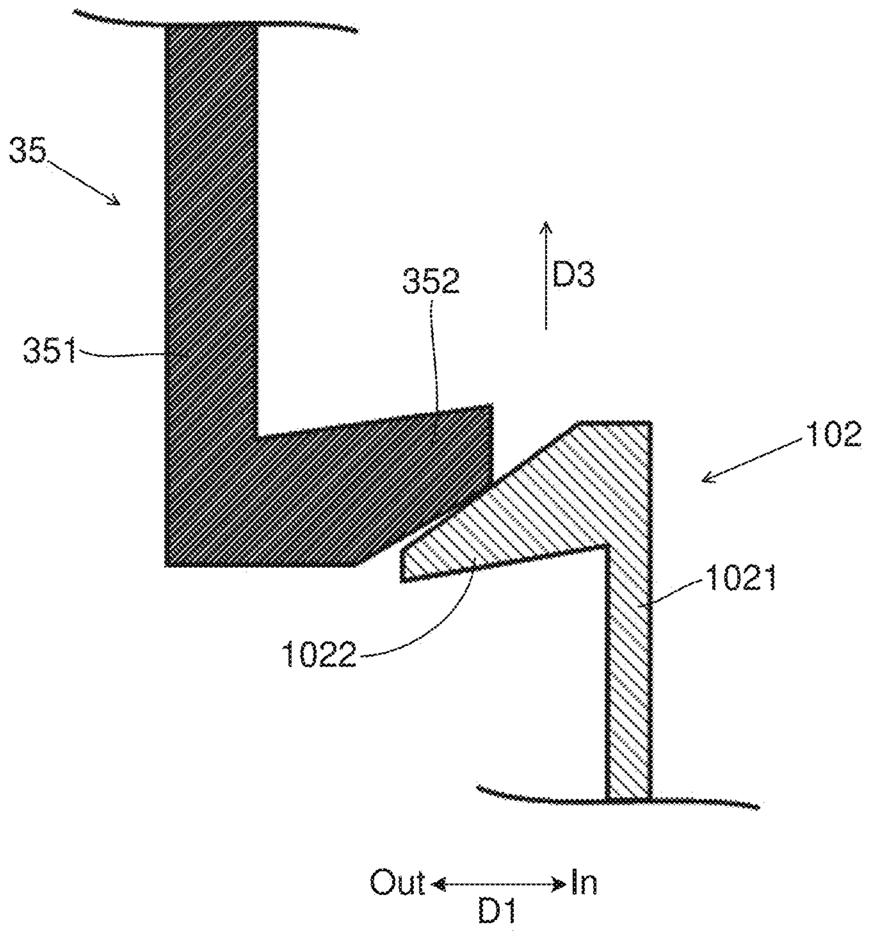
FIG. 16 is a diagram showing the shapes of the second pressing portion and the hook-side reception portion in the image forming apparatus according to the embodiment.

The second pressing portion 102 and the hook-side reception portion 35 have shapes shown in FIG. 16. The second pressing portion 102 includes a cover-side arm 1021 and a cover-side protrusion 1022 which protrudes from the cover-side arm 1021 in the width direction D1. The hook-side reception portion 35 includes a hook-side arm 351 and a hook-side protrusion 352 which protrudes from the hook-side arm 351 in the width direction D1.

The cover-side protrusion 1022 makes contact with the hook-side protrusion 352 from the other side opposite to the one side in the circumferential direction, and thus the cover-side protrusion 1022 presses the hook-side protrusion 352 from the other side in the circumferential direction to the one side. In other words, the pressing part of the second pressing portion 102 which actually presses the hook-side reception portion 35 is the cover-side protrusion 1022. The part to be pressed of the hook-side reception portion 35 which is actually pressed by the second pressing portion 102 is the hook-side protrusion 352. In FIG. 16, an outward direction in the width direction D1 is indicated by "OUT", and an inward direction in the width direction D1 is indicated by "In". In FIG. 16, the direction of pressing of the hook-side reception portion 35 which is performed by the second pressing portion 102 and results from the turning of the rear cover CV in the closing direction is indicated by an arrow D3. The same is true in FIG. 18 which will be described later.

In a state where the tip 31*a* of the hook portion 31 has passed through the lowest point P of the boss portion 10, the second pressing portion 102 presses the hook-side reception portion 35 to displace the locating member 3 to the one side in the circumferential direction. Consequently, the hook portion 31 engages with the boss portion 10, and thus a state shown in the lower diagram in FIG. 14 is achieved. After the hook portion 31 engages with the boss portion 10, the locating member 3 is biased by the torsion coil spring 4 to be displaced to the one side in the circumferential direction, and thus the engagement of the hook portion 31 with the boss portion 10 is maintained. The hook portion 31 engages with the boss portion 10, and thus the displacement of the locating member 3 to the one side in the circumferential direction is stopped. After the hook portion 31 engages with the boss portion 10, even when the turning of the rear cover CV in the closing direction is continued, that is, even when the second pressing portion 102 continues to press the hook-side reception portion 35, the locating member 3 is not displaced to the one side in the circumferential direction.

Here, the positions of the first turning shaft RA1 and the second turning shaft RA2 when viewed in the width direction D1 are different from each other. In other words, as shown in FIG. 13, the turning path T2 of the unit-side reception portion 24 which is turned around the axis line of the second turning shaft RA2 is displaced from the turning path T1 of the first pressing portion 101 which is turned around the axis line of the first turning shaft RA1.

Figure 17:
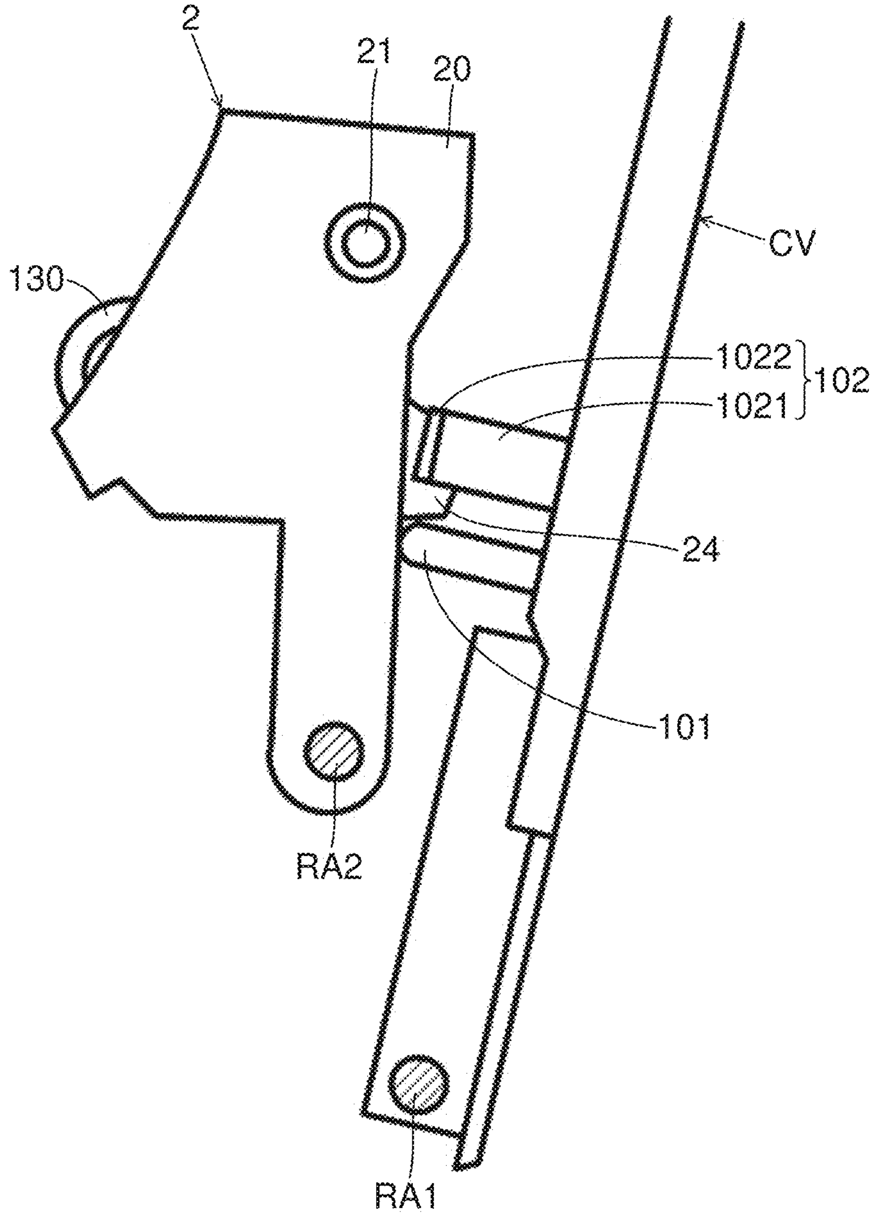
FIG. 17 is a diagram showing a state where the pressing of the unit-side reception portion performed by the first pressing portion in the image forming apparatus according to the embodiment is released.

In this way, after the turning of the rear cover CV in the closing direction is started until the rear cover CV reaches the closed position, as shown in FIG. 17, the pressing of the unit-side reception portion 24 performed by the first pressing portion 101 is released. The first pressing portion 101 and the unit-side reception portion 24 are turned away from each other. In FIG. 17, for ease of understanding, the locating member 3 is omitted.

Figure 18:
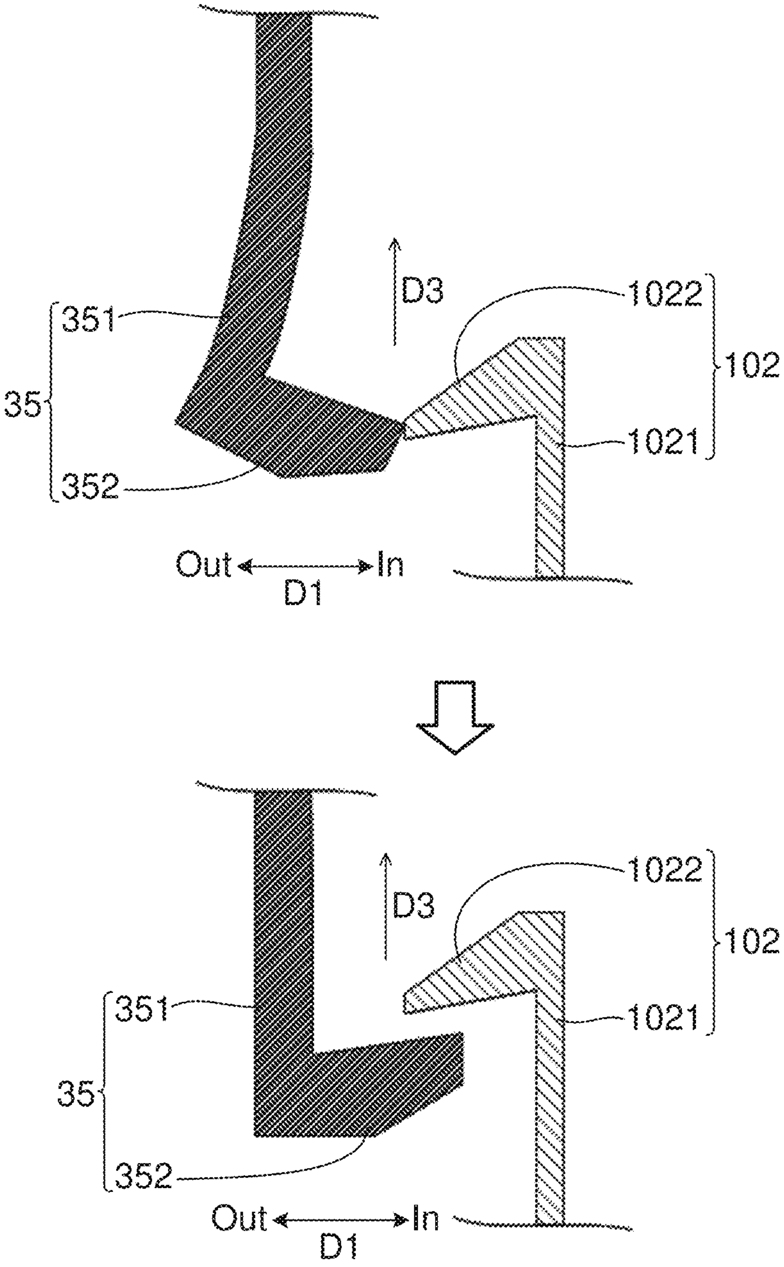
FIG. 18 is a diagram showing the transition of a state when the pressing of the hook-side reception portion performed by the second pressing portion in the image forming apparatus according to the embodiment is released.

After the hook portion 31 engages with the boss portion 10 to stop the displacement of the locating member 3 to the one side in the circumferential direction, the turning of the rear cover CV in the closing direction is continued, and thus as shown in FIG. 18, one of the second pressing portion 102 and the hook-side reception portion 35 is elastically deformed in a direction away from the other thereof. For example, both the second pressing portion 102 and the hook-side reception portion 35 are made of a resin which can be elastically deformed. Hence, when one of the second pressing portion 102 and the hook-side reception portion 35 is elastically deformed in a direction away from the other thereof, the other may be elastically deformed in a direction away from the one. In other words, both the second pressing portion 102 and the hook-side reception portion 35 may be elastically deformed in directions away from each other.

In a stage before the hook portion 31 engages with the boss portion 10, the cover-side protrusion 1022 is located on the other side opposite to the one side in the circumferential direction with respect to the hook-side protrusion 352 (see FIG. 16). In this way, the locating member 3 is pressed to be displaced to the one side in the circumferential direction.

After the hook portion 31 engages with the boss portion 10 to stop the displacement of the locating member 3 to the one side in the circumferential direction, when the turning of the rear cover CV in the closing direction is continued, one of the second pressing portion 102 and the hook-side reception portion 35 is elastically deformed in a direction away from the other thereof (see an upper diagram in FIG. 18). In this way, the second pressing portion 102 rides over the hook-side reception portion 35 to reach the one side in the circumferential direction with respect to the hook-side reception portion 35 (see a lower diagram in FIG. 18). Specifically, the cover-side protrusion 1022 rides over the hook-side protrusion 352 to reach the one side in the circumferential direction with respect to the hook-side protrusion 352. Consequently, the pressing of the hook-side reception portion 35 performed by the second pressing portion 102 is released.

In the present embodiment, the rear cover CV is further turned in the closing direction until the hook portion 31 engages with the boss portion 10, that is, until the secondary transfer roller 130 (that is, the conveyance unit 2) is appropriately pressed against the intermediate transfer belt 121 (that is, the main body-side unit 1) on the drive roller 122, and thus the pressing of the hook-side reception portion 35 performed by the second pressing portion 102 is released. At this point, the pressing of the unit-side reception portion 24 performed by the first pressing portion 101 has already been released. In other words, in a state where the secondary transfer roller 130 is appropriately pressed against the intermediate transfer belt 121 on the drive roller 122, the conveyance unit 2 is not pressed by the rear cover CV.

In this way, in a state where the conveyance unit 2 is retained in the first position, and the rear cover CV is retained in the closed position, a pressing force is not applied to the rear cover CV from the conveyance unit 2. Even when in a state where the conveyance unit 2 is retained in the first position, the conveyance unit 2 is not pressed by the rear cover CV, the engagement of the hook portion 31 with the boss portion 10 is achieved, and thus a state where the secondary transfer roller 130 is pressed against the intermediate transfer belt 121 on the drive roller 122 is retained.

If the rear cover CV continues to press the conveyance unit 2 to retain the conveyance unit 2 in the first position, inconvenience occurs in which the rear cover CV is deformed by the pressing force applied to the rear cover CV. In order to suppress the occurrence of such inconvenience, a countermeasure such as increasing the rigidity of the rear cover CV needs to be taken. For example, a countermeasure such as further increasing the thickness of the rear cover CV or adding ribs to the rear cover CV needs to be taken. When such a countermeasure is taken, the size of the image forming apparatus 100 is increased.

On the other hand, in the present embodiment, even when the rear cover CV does not continue to press the conveyance unit 2, the conveyance unit 2 can be retained in the first position. In this way, it is not necessary to increase the rigidity of the rear cover CV. Consequently, the conveyance unit 2 can be located without the size of the image forming apparatus 100 being increased.

Here, in the present embodiment, when viewed in the width direction D1, the position of the tip of the second part **10*b* of the boss portion 10 on the lower side is eccentric to the one side in the forward/backward direction D2 (that is, to the backward side) from the center position of a circle including the circumference of the first part 10*a*. In this way, while the conveyance unit 2 is being turned by being pressed by the rear cover CV, the tip 31*a* of the hook portion 31** rapidly passes through the lowest point P.

After the tip **31*a* of the hook portion 31 passes through the lowest point P, the locating member 3 is displaced to the one side in the circumferential direction by the biasing force of the torsion coil spring 4. In other words, after the tip 31*a* of the hook portion 31 passes through the lowest point P, a force for turning the conveyance unit 2** to the first position is newly generated. In this way, a force for closing the rear cover CV can be reduced.

<Turning of Conveyance Unit to Second Position>

In a state where the rear cover CV is in the closed position, and the conveyance unit 2 is retained in the first position (that is, in a state where the hook portion 31 engages with the boss portion 10), the cover-side protrusion 1022 of the second pressing portion 102 is located on the one side in the circumferential direction with respect to the hook-side protrusion 352 of the hook-side reception portion 35. When in this state, the rear cover CV is turned from the closed position in the opening direction, the cover-side protrusion 1022 engages with the hook-side protrusion 352 from the one side in the circumferential direction.

Then, when the rear cover CV is further turned in the opening direction, the cover-side protrusion 1022 of the second pressing portion 102 presses the hook-side protrusion 352 of the hook-side reception portion 35 from the one side in the circumferential direction. In this way, the locating member 3 is displaced to the other side in the circumferential direction against the biasing force of the torsion coil spring 4.

The locating member 3 is displaced to the other side in the circumferential direction, and thus the tip **31*a* of the hook portion 31 reaches the lowest point P and rides over the lowest point P. In other words, the tip 31*a* of the hook portion 31 passes through the lowest point P from the other side part of the boss portion 10 to reach the one side part of the boss portion 10. Consequently, the engagement of the hook portion 31 with the boss portion 10** is released.

In the present embodiment, an operation of turning the rear cover CV from the closed position in the opening direction is performed, and thus the locating of the conveyance unit 2 with respect to the main body-side unit 1 performed by the locating member 3 is released, with the result that the conveyance unit 2 can be turned from the first position to the second position. This is convenient for the operator because it is possible to cause the conveyance unit 2 to reach the second position only by opening the rear cover CV.

It should be considered that the embodiment disclosed herein is illustrative in all respects, and not restrictive. The scope of the present disclosure is indicated not by the description of the above embodiment but by the scope of claims, and furthermore, meanings equivalent to the scope of claims and all changes in the scope are included therein.

What is claimed is:

1. A unit locating mechanism comprising:

a cover that is turned around an axis line of a first turning shaft extending in a first direction orthogonal to an up/down direction to be able to be displaced between a closed position in which an interior of a main body frame is covered from one side in a second direction horizontally orthogonal to the first direction and an open position other than the closed position;

a first unit that is fitted to the interior of the main body frame and includes a boss portion;

a second unit that is arranged on a downstream side in a closing direction extending from the open position to the closed position with respect to the cover and is turned around an axis line of a second turning shaft extending parallel to the first turning shaft in a position which is above the first turning shaft and is on an other side opposite to the one side in the second direction with respect to the first turning shaft so as to be able displaced between a first position located with respect to the first unit and a second position other than the first position;

a locating member that is attached to the second unit to retain the second unit in the first position; and a torsion coil spring that is attached to the locating member, wherein the locating member includes:

a cylindrical portion in which the first direction is a direction of a cylindrical shaft; and a hook portion that is arranged radially outward of the cylindrical portion when viewed in the first direction, can engage with the boss portion so as to hold the boss portion from one side in a circumferential direction around a center of the cylindrical shaft of the cylindrical portion and engages with the boss portion when the second unit is in the first position to restrict the turning of the second unit from the first position to the second position, the second unit includes a support shaft to which the cylindrical portion is fitted and which supports the locating member such that the locating member can be displaced in the circumferential direction, the torsion coil spring biases the locating member to the one side in the circumferential direction that causes the hook portion to engage with the boss portion, the cover includes a first pressing portion and a second pressing portion, the second unit includes a unit-side reception portion that receives a pressure from the first pressing portion, the locating member includes a hook-side reception portion that receives a pressure from the second pressing portion, when the cover is turned from the open position in the closing direction, the first pressing portion starts to press the unit-side reception portion such that the second unit is turned to the first position, after the first pressing portion starts to press the unit-side reception portion, a tip of the hook portion is in contact with the boss portion such that the locating member is displaced to an other side in the circumferential direction against a biasing force of the torsion coil spring, after a contact point of the tip of the hook portion with the boss portion passes through a lowest point of the boss portion when viewed in the first direction, the second pressing portion is in contact with the hook-side reception portion from the one side in the circumferential direction such that the second pressing portion starts to press the hook-side reception portion to displace the locating member to the one side in the circumferential direction and the locating member is displaced to the one side in the circumferential direction to cause the hook portion to engage with the boss portion, after the turning of the cover in the closing direction is started until the cover reaches the closed position, positions of the first turning shaft and the second turning shaft when viewed in the first direction are different from each other such that the unit-side reception portion is separated from the first pressing portion and after the hook portion engages with the boss portion to stop the displacement of the locating member to the one side in the circumferential direction, the turning of the cover in the closing direction is continued such that one of the second pressing portion and the hook-side reception portion is elastically deformed in a direction away from an other thereof, the second pressing portion rides over the hook-side reception portion and the pressing of the hook-side reception portion performed by the second pressing portion is released.

2. The unit locating mechanism according to claim 1, wherein when viewed in the first direction, the boss portion includes:

a first part that has an arc-shaped circumference; and a second part that protrudes downward from the first part and is V-shaped in side view, in the boss portion, a position of a tip of the second part is the lowest point and the position of the tip of the second part is eccentric to the one side in the second direction from a center position of a circle including the circumference of the first part.

3. The unit locating mechanism according to claim 1, wherein when the cover is turned from the closed position to the open position, the second pressing portion presses the hook-side reception portion from the one side in the circumferential direction such that the locating member is displaced to the other side in the circumferential direction against the biasing force of the torsion coil spring so as to release the engagement of the hook portion with the boss portion.

4. An image forming apparatus comprising:

the unit locating mechanism according to claim 1, wherein the first unit is a unit that includes an image carrying member which carries an image, the second unit is a unit that includes a transfer roller, the second unit is retained in the first position such that the image carrying member and the transfer roller are pressed against each other so as to form a transfer nip between the image carrying member and the transfer roller and a sheet is conveyed into the transfer nip, and the image is transferred to the sheet.

* * * * *